US007769089B1

(12) United States Patent
Chou

(10) Patent No.: US 7,769,089 B1
(45) Date of Patent: Aug. 3, 2010

(54) METHOD AND SYSTEM FOR REDUCING NOISE LEVEL IN A VIDEO SIGNAL

(75) Inventor: Chih-Hsien Chou, San Jose, CA (US)

(73) Assignee: Kolorific, Inc., Milpitas, CA (US)

( * ) Notice: Subject to any disclaimer, the term of this patent is extended or adjusted under 35 U.S.C. 154(b) by 1219 days.

(21) Appl. No.: 11/345,739

(22) Filed: Feb. 2, 2006

Related U.S. Application Data

(63) Continuation-in-part of application No. 11/001,826, filed on Dec. 2, 2004, now Pat. No. 7,616,693.

(51) Int. Cl.
*H04N 7/12* (2006.01)

(52) U.S. Cl. ............................. 375/240.29; 375/240.26; 382/275; 382/260; 382/261; 382/262; 382/263; 382/264; 382/265; 382/266

(58) Field of Classification Search ............ 375/240.29, 375/240.26; 382/275, 260, 261, 262, 263, 382/264, 265, 266
See application file for complete search history.

(56) References Cited

U.S. PATENT DOCUMENTS

| 4,926,361 | A | | 5/1990 | Ohtsubo et al. | |
|---|---|---|---|---|---|
| 5,400,083 | A | | 3/1995 | Mizusawa | |
| 5,657,401 | A | | 8/1997 | Haan et al. | |
| 5,715,335 | A | | 2/1998 | Haan et al. | |
| 5,764,307 | A | * | 6/1998 | Ozcelik et al. | 348/608 |
| 6,061,100 | A | * | 5/2000 | Ward et al. | 348/607 |
| 6,535,254 | B1 | * | 3/2003 | Olsson et al. | 348/607 |
| 6,714,258 | B2 | | 3/2004 | Stessen et al. | |
| 7,295,616 | B2 | * | 11/2007 | Sun et al. | 375/240.27 |
| 7,616,693 | B2 | * | 11/2009 | Chou et al. | 375/240.26 |
| 2002/0028025 | A1 | * | 3/2002 | Hong | 382/260 |
| 2005/0105627 | A1 | * | 5/2005 | Sun et al. | 375/240.29 |
| 2005/0107982 | A1 | * | 5/2005 | Sun et al. | 702/179 |
| 2006/0285020 | A1 | * | 12/2006 | Shin et al. | 348/701 |
| 2007/0195199 | A1 | * | 8/2007 | Chen et al. | 348/607 |

OTHER PUBLICATIONS

Takamichi Nakano, "Development of the NR-FIFO series imaging noise reduction LSI", OKI Technical Review, Oct. 2003, Issue 196 vol. 70 No. 4.
Gerard De Haan, et al, "Television noise reduction IC", IEEE Trans. on Consumer Electronics, vol. 44, No. 1, Feb. 1998, pp. 143-154.

* cited by examiner

*Primary Examiner*—Sudhanshu C Pathak
(74) *Attorney, Agent, or Firm*—Pinnacle Patent Law Group

(57) ABSTRACT

A method of reducing noise levels in an input video signal comprising pixel data includes receiving input pixel data of the input video signal, where the input pixel data comprises luminance data and chrominance data, and estimating a noise level of the input video signal using the luminance data of the input pixel data. A plurality of filter parameters are identified based on the estimated noise level, and the input pixel data is filtered using a three dimensional spatiotemporal noise reduction filter that is controlled by a first set of the plurality of filter parameters. Thereafter, the method includes filtering the filtered input pixel data using a one dimensional temporal noise reduction filter with motion compensation that is controlled by a second set of the plurality of filter parameters, and generating a noise-filtered output video signal that includes the filtered input pixel data from the three dimensional spatiotemporal noise reduction filter and the motion compensated filtered input pixel data from the one dimensional temporal noise reduction filter.

16 Claims, 19 Drawing Sheets

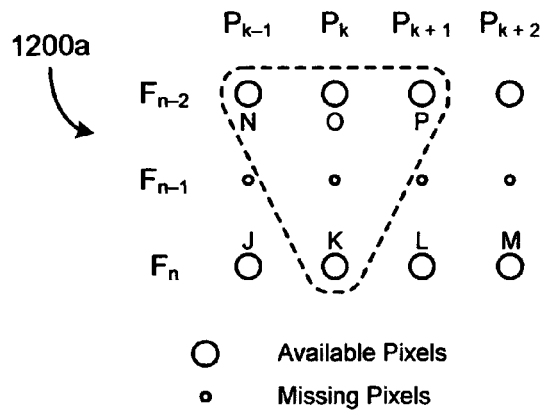
*FIG. 12A*
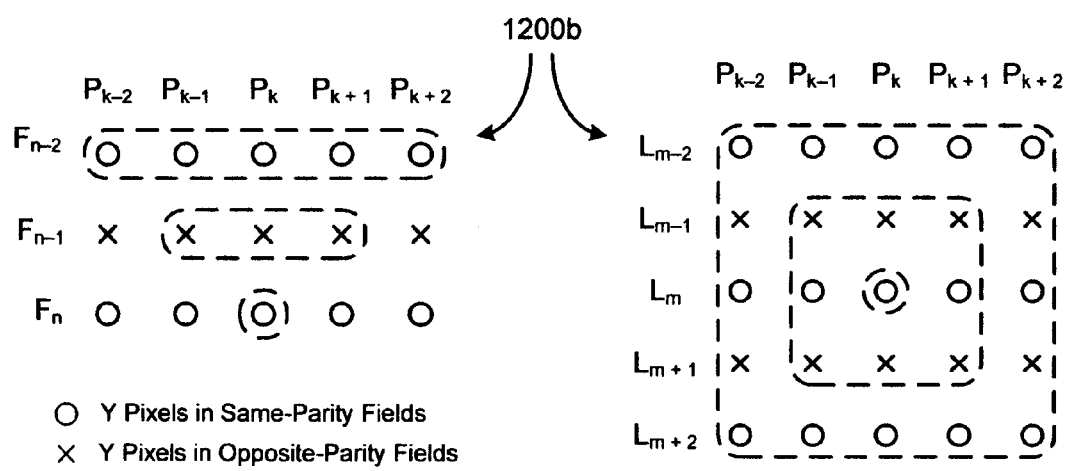
*FIG. 12B*          *FIG. 12C*

METHOD AND SYSTEM FOR REDUCING NOISE LEVEL IN A VIDEO SIGNAL

RELATED PATENT APPLICATIONS

The present application is a continuation-in-part application of patent application entitled METHOD AND SYSTEM FOR DETECTING MOTION BETWEEN VIDEO FIELD OF SAME AND OPPOSITE PARITY FROM AN INTERLACED VIDEO SOURCE (Ser. No. 11/001,826), filed on Dec. 2, 2004 now U.S. Pat. No. 7,616,693 and assigned to the assignee of the present invention.

FIELD OF THE INVENTION

The present invention relates in general to digital image and video signal processing and in particular to a digital signal processing method and system for automatically reducing the noise level in an input video signal.

BACKGROUND OF THE INVENTION

The NTSC, PAL, and SECAM analog television standards and the ITU-R BT.601 and ITU-R BT.709 digital video television standards are in widespread use throughout the world today. All of these standards make use of interlacing video signals in order to maximize the vertical refresh rate, which reduces wide area flicker, while minimizing the bandwidth required for transmission. With an interlaced video format, half of the lines that make up a picture are displayed during one vertical period (i.e. the even video field), while the other half are displayed during the next vertical period (i.e. the odd video field) and are positioned halfway between the lines displayed during the first period. While this technique has the benefits described above, the use of interlacing can also lead to the appearance of visual artifacts such as line flicker for stationary objects and line crawling for moving objects.

The visual artifacts can be minimized and the appearance of an interlaced image can be improved by converting the interlaced video signal to a non-interlaced (progressive) format and displaying it as such. In fact, many newer display technologies, such as for example Liquid Crystal Displays (LCD), Plasma Display Panels (PDP), and Digital Micromirror Devices (DMD) are designed to display progressively scanned, i.e., non-interlaced, video images.

A conventional progressive video signal display system, e.g., a television (TV) or a projector, is illustrated in FIG. 1. As is shown the display system 20 includes a signal receiving unit 22 that is coupled to a tuner box 24, and a video decoder 28. Signals, such as television signals, are captured by the signal receiving unit 22 and transmitted to the tuner box 24. The tuner box 24 includes a converter 25 and a demodulation unit 26 that transforms the incoming signal into an analog signal. The analog signal 27 is received by the video decoder 28, which outputs an interlaced video signal 29. As stated above, if the interlaced video signal 29 is displayed, undesirable visual artifacts, such as line flicker and line crawling, exist. Accordingly, a de-interlacer 30 is used to convert, i.e., de-interlace, the interlaced video signal 29 to generate a progressive video signal 32. The progressive video signal 32 is then displayed via a display 34, such as an LCD, a PDP, or a DMD.

Numerous methods have been proposed for de-interlacing an interlaced video signal to generate a progressive video signal. For instance, some methods perform a simple spatial-temporal de-interlacing technique, such as line repetition and field insertion. These methods, however, do not necessarily take into consideration motion between video fields. For instance, it is well known that while line repetition may be acceptable for image regions having motion, line repetition is not suitable for stationary (still) image regions due to loss of vertical spatial resolution. By the same token, field insertion is a satisfactory de-interlacing method for stationary image regions, but inadequate for moving image regions due to objectionable motion artifacts. Therefore, utilizing one method presents a tradeoff between vertical spatial resolution and motion artifacts To address this issue, some de-interlacing methods are motion adaptive, i.e., they take into consideration the motion from video field to video field and/or from pixel to pixel in adjacent video fields. Motion adaptive de-interlacing methods can dynamically switch or mix between different de-interlacing methods, such as between line repetition and field insertion. Per-field motion adaptive de-interlacing methods select a de-interlacing technique on a field-by-field basis. Thus, per-field motion adaptive de-interlacing methods do not maintain the overall quality throughout an image when there are both stationary and moving regions on it. Whereas, per-pixel motion adaptive de-interlacing methods select a de-interlacing technique on a pixel-by-pixel basis, thus providing a much better overall quality throughout an image.

Yet more de-interlacing methods are based on identifying the type of the source material from which the interlaced video signal was generated. For example, motion picture film or computer graphics signals are inherently progressive, i.e., non-interlaced. When the signals are transmitted for broadcasting, the signals are converted into interlaced video signals according to analog TV standards such as NTSC, PAL, and SECAM, or digital video standards such as ITU-R BT.601 and ITU-R BT.709 interlaced formats. Well known techniques such as 3:2 pull-down or 2:2 pull-down are used to break the original progressive frames into interlaced video fields while maintaining the correct frame rate. De-interlacing such signals originating from such non-interlaced (progressive) sources can be achieved with high quality if the original progressive frame sequences can be identified and reconstructed correctly. Thus, by recognizing that a video sequence originates from a progressive source, the original progressive frames can be reconstructed exactly by merging the appropriate video fields.

Typically, the source of the interlaced video signal can be determined by examining the motion between successive fields of an input video sequence. In a co-pending patent application entitled "METHOD AND SYSTEM FOR DETECTING MOTION BETWEEN VIDEO FIELD OF SAME AND OPPOSITE PARITY FROM AN INTERLACED VIDEO SOURCE," (Ser. No. 11/001,826), filed on Dec. 2, 2004, and herein incorporated in its entirety by reference, a same and opposite-field motion detection system is described. The motion detection system measures the signal values of one set of vertically adjacent pixels from a video field of one parity and two other sets of vertically adjacent pixels from the two neighboring video fields of the opposite parity such that when taken together, these pixels represent relevant samples of an image near the vertical and temporal positions. The motion detection system then calculates three sets of motion values, where one set is between the subject video field and its previous video field, a second set is between the subject video field and its subsequent video field, and the third set is between the previous video field and the subsequent video field.

FIG. 2 is a schematic representation of eight pixels used by the motion detection system to calculate motion values according to one embodiment. Three consecutive fields (10a, 10b, 10c) are shown. A subject field 10b is preceded by a preceding field 10a and followed by a subsequent field 10c. Three pixels 14 in each of the preceding 10a and subsequent 10c fields and two pixels 14 in the subject field 10b are used to calculate same and opposite-field motion measurements pertaining to a target pixel 16, the value of which is to be interpolated. All eight pixels 14 are vertically adjacent in their respective fields and they form a butterfly profile in the temporal-vertical plane as shown in FIG. 2. The three sets of motion values calculated from the pixels 14 can be used to determine an appropriate de-interlacing technique to be used to calculate the interpolated value of the target pixel 16.

While the motion detection system described in the aforementioned co-pending patent application performs well for its intended purpose, those skilled in the art readily appreciate that the motion values derived from the pixels 14 can be distorted by noise in the video signal itself. In the NTSC, PAL, or SECAM analog video system, noise can be created or inadvertently added to the video signal through the capture, duplication, editing, transmission/reception, modulation/demodulation, and encoding/decoding processes. Moreover, a digital video signal can also contain noise, either from noise present in the original analog content or introduced as a result of digital compression/decompression processes.

In general, noise in the video signal distorts the visual appearance of the image and is particularly objectionable to the human eye when the image contains large areas of solid colors, and especially when the luminance levels are low (e.g., in shades of saturated colors). Thus, reducing or eliminating noise from the video signal is desirable in high quality display components, such as televisions, computer monitors, DVD players, digital cameras, and the like.

Typically, noise reduction of a video signal is based on the difference in the statistical properties between correlated pixel values conveying an image and random pixel values due to noise. Noise reduction is typically implemented through some form of linear or nonlinear operation on the input pixel data. The operation typically involves linear filtering (e.g., weighted averaging) for additive white Gaussian noise (AWGN) or order-statistical filtering (e.g., maximum, minimum, or median) for impulsive noise. The correlation between pixel data values of a video signal is typically based on the temporal or spatial proximity of the pixels. The pixels inside a temporal or spatial neighborhood for performing the linear or nonlinear operation are collectively referred to as a noise filter support. These pixels are usually selected based on criteria, such as "K-nearest neighbors", i.e., the K neighboring pixels whose values are nearest to the target pixel value, and/or "sigma nearest neighbors", i.e., those neighboring pixels whose difference from the target pixel is less that a predetermined parameter. The selection process is generally based on the difference between the target pixel and its temporal or spatial neighbors.

Conventional video signal noise reduction systems can perform noise reduction operations in either the spatial or temporal domains to reduce visual artifacts due to noise. Spatial noise reduction systems perform noise reduction within a frame or field and can be rather effective in reducing AWGN. Temporal noise reduction systems perform noise reduction between frames/fields and can be more effective in reducing low-KOLR frequency noise (LFN) such as clamp noise in an analog video signal. Thus, ideally, a noise reduction system should perform both spatial and temporal noise reduction operations to reduce both AWGN and LFN.

Nonetheless, a noise reduction system that performs both spatial and temporal noise reduction operations requires pixel and/or line buffers as well as frame/field buffers. Frame/field buffers are particularly costly and also increase the complexity of the system. Moreover, reading and writing video field pixel data from and to the frame/field buffers consume system resources, such as memory bandwidth and power consumption. Thus, while desirable, such a system is less economically feasible.

SUMMARY OF THE INVENTION

In one embodiment, a method of reducing noise levels in an input video signal comprising pixel data includes receiving input pixel data of the input video signal, where the input pixel data comprises luminance data and chrominance data, and estimating a noise level of the input video signal using the luminance data of the input pixel data. A plurality of filter parameters are identified based on the estimated noise level, and the input pixel data is filtered using a three dimensional spatiotemporal noise reduction filter that is controlled by a first set of the plurality of filter parameters. Thereafter, the method includes filtering the filtered input pixel data using a one dimensional temporal noise reduction filter with motion compensation that is controlled by a second set of the plurality of filter parameters, and generating a noise-filtered output video signal that includes the filtered input pixel data from the three dimensional spatiotemporal noise reduction filter and the motion compensated filtered input pixel data from the one dimensional temporal noise reduction filter.

In another embodiment, a method of detecting motion in an input video signal comprising pixel data from a plurality of interlaced video fields includes receiving input pixel data of the input video signal, where the input pixel data comprises luminance data and chrominance data and reducing noise levels in the input video signal by estimating a noise level of the input video signal using the luminance data of the input pixel data, identifying a plurality of filter parameters based on the estimated noise level, filtering the input pixel data using a three dimensional spatiotemporal noise reduction filter that is controlled by a first set of the plurality of filter parameters, filtering the filtered input pixel data using a one dimensional temporal noise reduction filter with motion compensation that is controlled by a second set of the plurality of filter parameters, and generating a noise-filtered video signal that includes the noise-filtered pixel data from the three dimensional spatiotemporal noise reduction filter and from the one dimensional temporal noise reduction filter with motion compensation. The noise-filtered pixel data corresponding to pixels from a subject interlaced video field having a specified parity, and from the two adjacent interlaced video fields having a parity opposite to the specified parity are received. The noise-filtered pixel data from the subject and the two adjacent interlaced video fields are compared, and per-pixel motion measures between the subject interlaced video field and each of the two adjacent interlaced video fields and between the two adjacent interlaced video fields are calculated.

In another embodiment, a system for reducing noise levels in an input video signal comprising pixel data includes a noise estimation unit that receives input pixel data of the input video signal, where the input pixel data comprises luminance data and chrominance data, and estimates a noise level of the input video signal, a parameter control unit coupled to the noise estimation unit that identifies a plurality of filter parameters based on the estimated noise level, a three dimensional spatiotemporal noise reduction filter that is controlled by a first set of the plurality of filter parameters and that filters the input pixel data, and a one dimensional temporal noise reduction filter with motion compensation that is controlled by a second set of the plurality of filter parameters and that filters the filtered input pixel data.

DESCRIPTION OF THE DRAWINGS

These features, aspects and advantages of the present invention will become better understood with regard to the following description, appended claims, and accompanying drawings, which illustrate examples of the invention. It is to be understood, however, that each of the features can be used in the invention in general, not merely in the context of the particular drawings, and the invention includes any combination of these features, where:

FIGS. 12A-12C illustrate exemplary motion detection windows for the temporal noise filter kernel according to one embodiment.

DESCRIPTION OF THE INVENTION

The present invention relates in general to digital image and video signal processing and in particular to a digital signal processing method and system for automatically reducing the noise level in an input video signal. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

According to an embodiment of the present invention, a three dimensional spatiotemporal noise reduction module is integrated with a motion detection system, such as that described in the co-pending patent application Ser. No. 11/001,826. The field buffers that are utilized by the motion detection system are also utilized by the noise reduction module. Accordingly, by sharing resources that are already available, the three dimensional spatiotemporal noise reduction module can be implemented without unduly impacting the complexity and cost of the overall display system.

Figure 1:
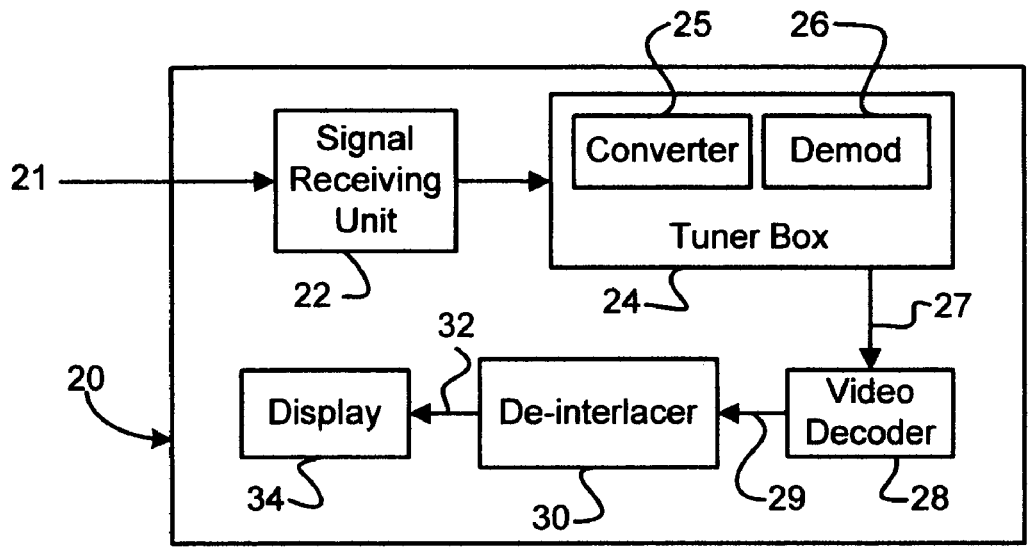
FIG. 1 is a block diagram of a conventional progressive video signal display system.
Figure 2:
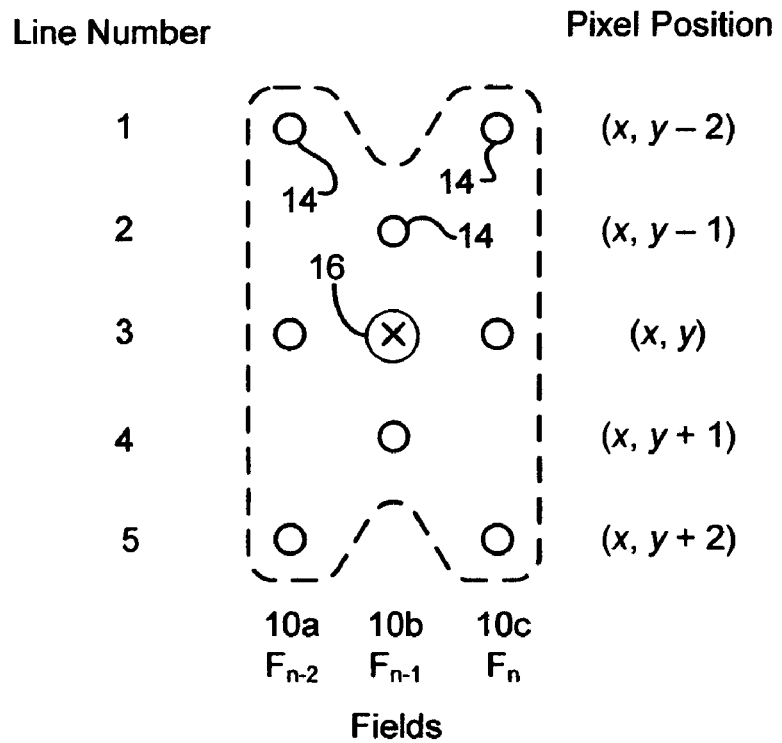
FIG. 2 illustrates a schematic representation of eight pixels used to calculate motion data according to an embodiment of the present invention.
Figure 3:
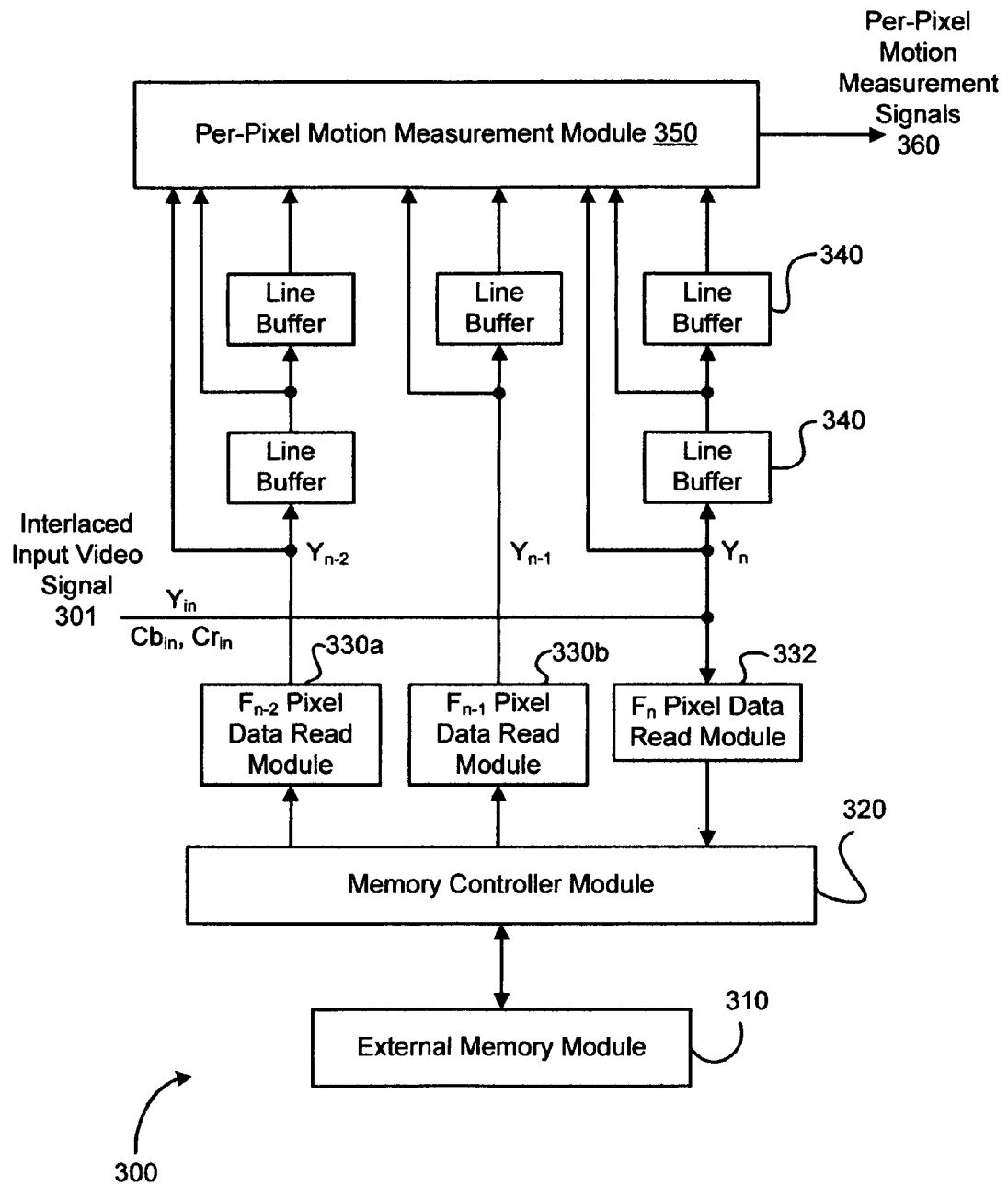
FIG. 3 a schematic block diagram of one embodiment of a motion detection system.

FIG. 3 is a schematic block diagram of one embodiment of the motion detection system described in co-pending patent application Ser. No. 11/001,826. The system 300 includes an external memory module 310, a memory controller module 320, a plurality of pixel data read modules 330a, 330b and a pixel data write module 332. The external memory module 310 is configured to store pixel data from a plurality of video fields 10a-10c (FIG. 2). The memory controller module 320 receives an interlaced input video signal 301 from the subsequent video field, $F_n$, via the pixel data write module 332 and stores the pixel data in the external memory module 310. In addition, the memory controller module 320 retrieves pixel data from the subject video field, $F_{n-1}$, and from the preceding video field, $F_{n-2}$, and passes the pixel data to a pixel data read module 330a, 330b corresponding to the field.

In a preferred embodiment, the system 300 includes a per-pixel motion measurement module 350 which receives the pixel data corresponding to the pixels 14 used to detect motion around a target pixel 16 (FIG. 2). In one embodiment, a plurality of line buffers 340 are utilized to provide the pixel data corresponding to the eight pixels 14 shown in FIG. 2. The per-pixel motion measurement module 350 analyzes the pixel data and calculates per-pixel motion measurement signals 360, which are then used to determine the overall level of motion at the target pixel 16 position.

Figure 4:
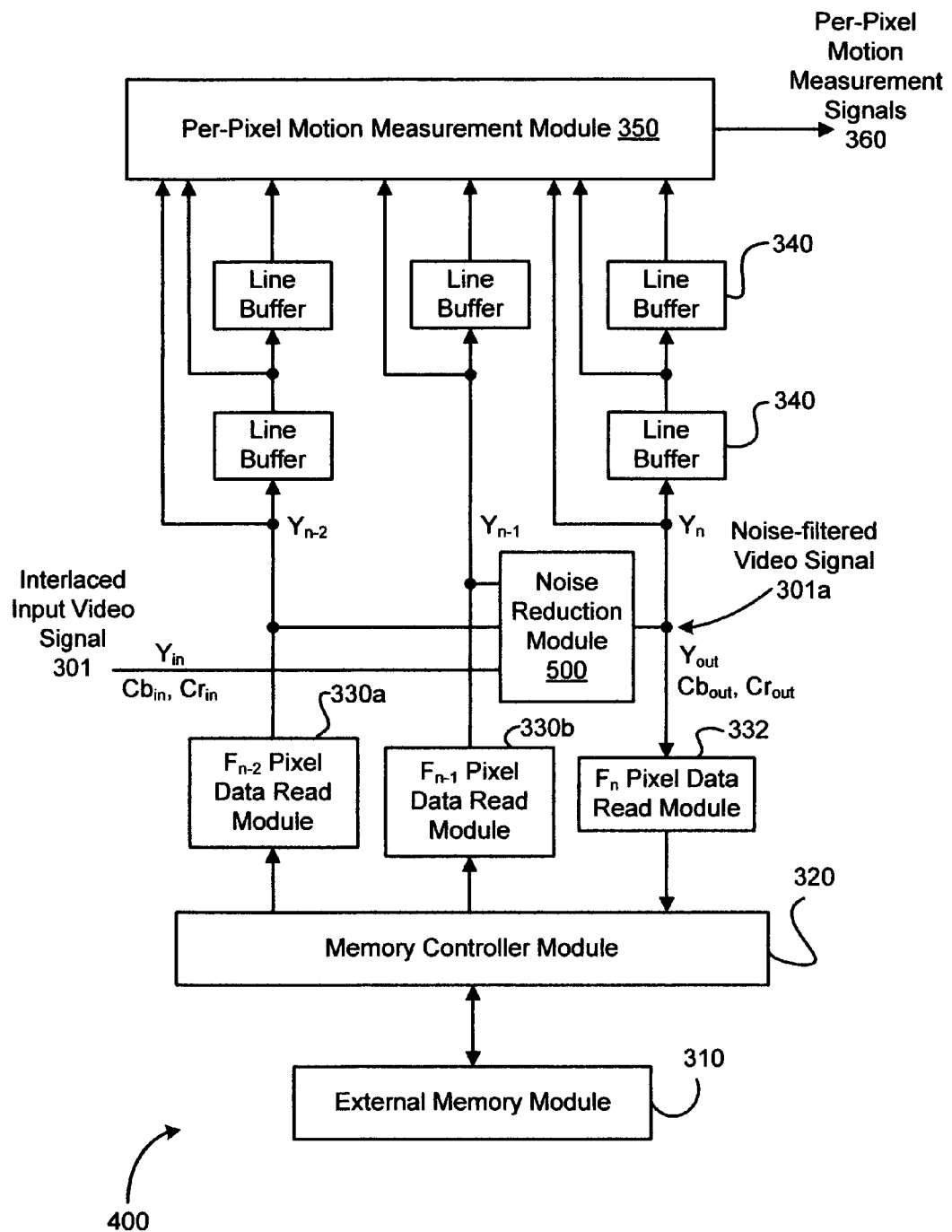
FIG. 4 is a schematic block diagram of a noise reduction module integrated with the motion detection system of FIG. 3 according to an embodiment of the present invention.

FIG. 4 is a block diagram of the integrated three dimensional spatiotemporal noise reduction system according to a preferred embodiment of the present invention. As is shown, the system 400 includes a noise reduction module 500 that receives the interlaced input video signal 301, as well as pixel data from the pixel data read modules 330a, 330b corresponding to the preceding 10a and the subject 10b video fields, respectively. The noise reduction module 500 performs spatial and temporal noise reduction operations on the interlaced input video signal 301 and outputs a noise-filtered video signal 301a, which is received by the motion detection system 300 illustrated in FIG. 3. Notably, the noise reduction module 500 shares the pixel data read modules 330a, 330b, the memory controller module 320 and the external memory module 310 with the motion detection system 300 such that the spatiotemporal noise reduction system 400 is implemented without significant additional costs.

Figure 5:
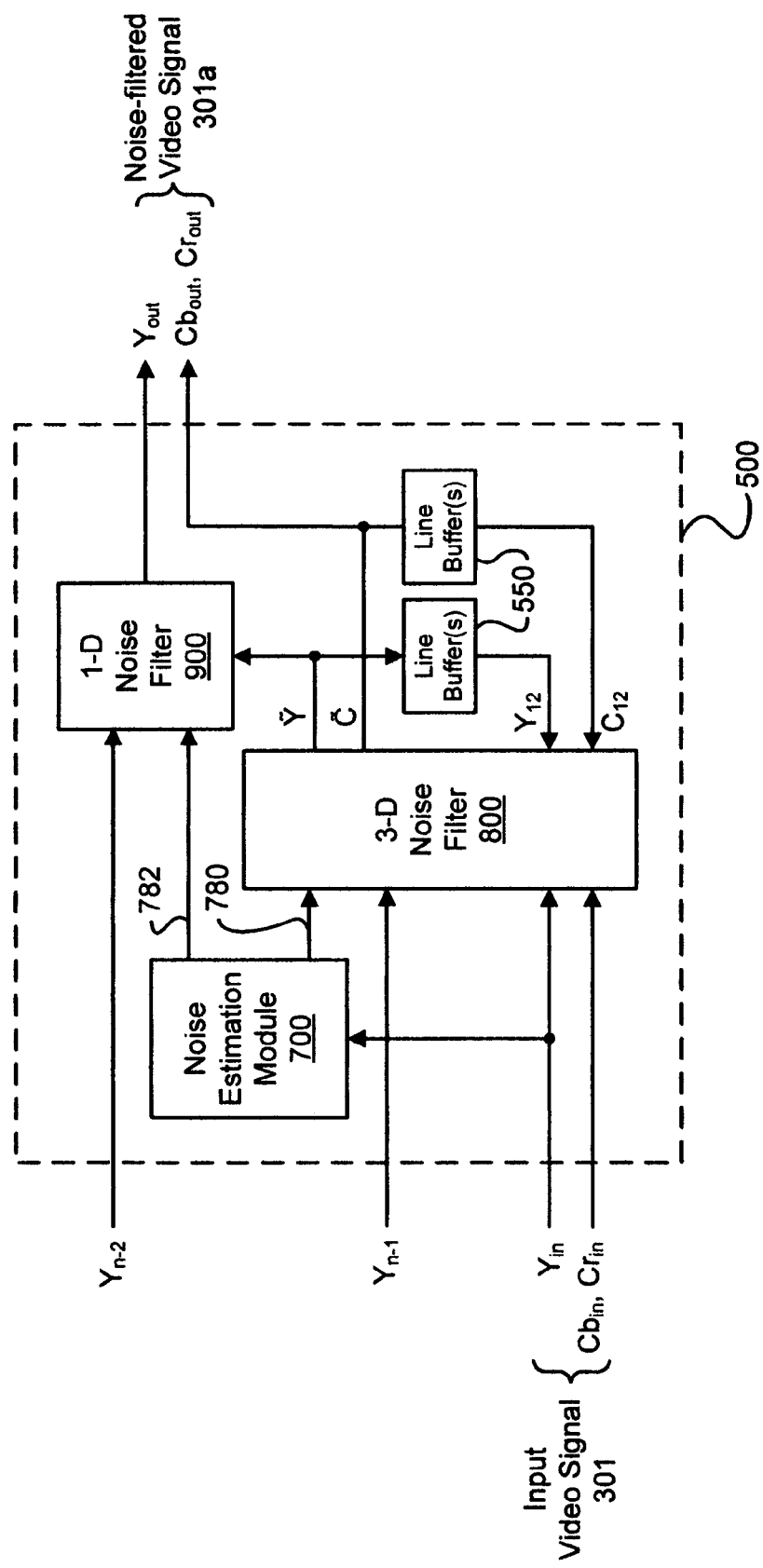
FIG. 5 is a block diagram of the noise reduction module according to an embodiment of the present invention.
Figure 6:
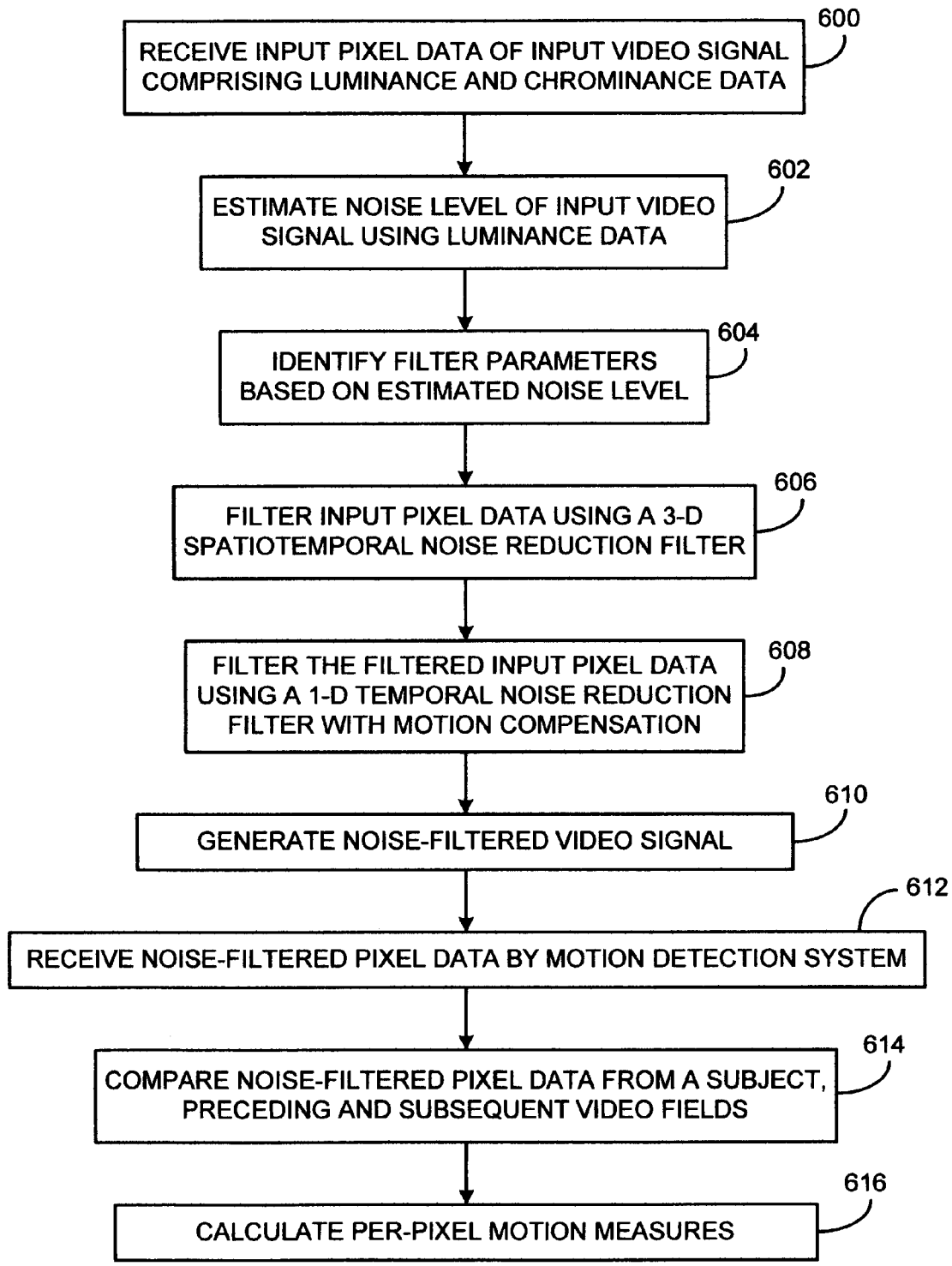
FIG. 6 is a flowchart illustrating an exemplary process for reducing noise in an input video signal and using the noise-filtered video signal to detect motion according to one embodiment of the present invention.

FIG. 5 is a block diagram of the noise reduction module 500 and FIG. 6 is a flowchart illustrating an exemplary process for reducing noise levels in the input video signal using the noise reduction module 500 according to an embodiment of the present invention. Referring to FIG. 5 and FIG. 6, the noise reduction module 500 includes a noise estimation module 700 and two (2) noise filters 800, 900. The noise reduction module 500 receives input pixel data of the input video signal (301), where the pixel data includes luminance and chrominance data (block 600). The noise estimation module 700 receives the luminance data, i.e., $Y_{in}$, of the input video signal, and estimates the noise level of the input video signal (block 602), and identifies a plurality of filter parameters based on the estimated noised level (block 604). In a preferred embodiment, the filter parameters control the filtering processes performed by the two noise filters 800, 900.

The first of the two noise filters is preferably a three-dimensional (3-D) spatiotemporal noise reduction filter 800 that filters the noise present in the input pixel data, i.e., the input luminance data ($Y_{in}$) and chrominance data ($Cb_{in}$, $Cr_{in}$) according to a first set of filter parameters (block 606). The second of the two noise filters is preferably a one dimensional (1-D) temporal noise reduction filter with motion compensation 900 that receives the filtered luminance data ($\tilde{Y}$) and filters the filtered luminance data ($\tilde{Y}$) according to a second set of filter parameters (block 608). A noised-filtered video signal 301a comprising the filtered input pixel data from the 3D spatiotemporal noise reduction filter 800 and the motion compensated filtered input pixel data from the 10 temporal noise reduction filter 900 is generated and outputted (block 610).

In one embodiment where the input video signal (301) is an interlaced video signal, the noise-filtered video signal 301a is then received by the motion detection system 300, such as that shown in FIG. 3 (block 612). In one embodiment, the noise-filtered video signal 301a comprises noise-filtered pixel data corresponding to pixels from a subject interlaced video field having a specified parity, and from the two adjacent interlaced video fields having a parity opposite to the specified parity. The motion detection system 300 compares the noise-filtered pixel data from the subject and the two adjacent interlaced video fields (block 614) and then calculates per-pixel motion measures between the subject interlaced video field and each of the two adjacent interlaced video fields and between the two adjacent interlaced video fields (block 616).

Figure 7A:
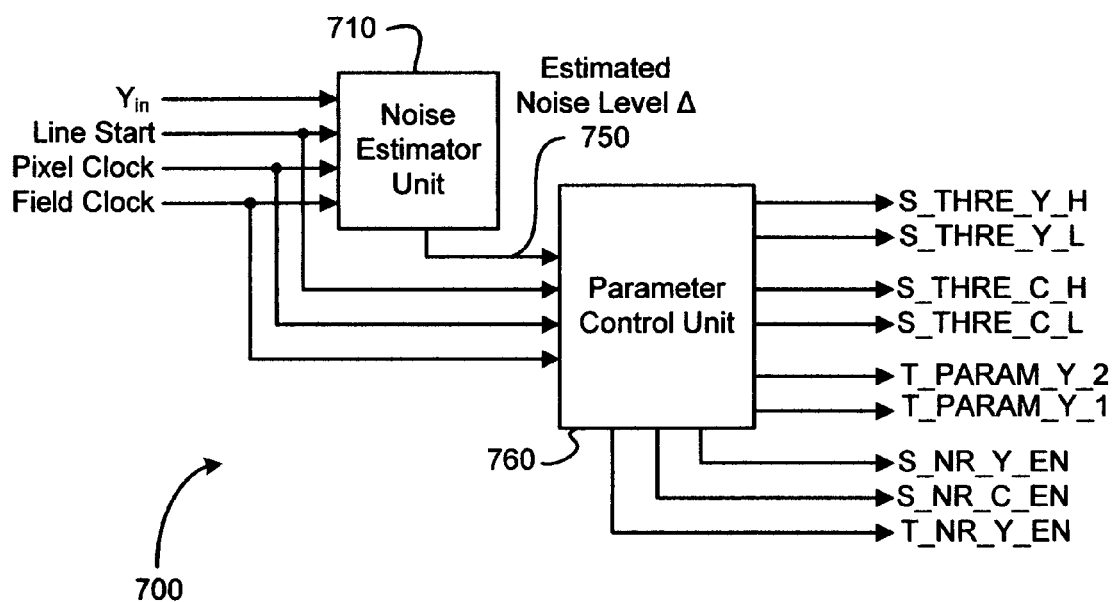
FIGS. 7A-7E pertain to the noise estimation module according to embodiments of the present invention.

Each component of the noise reduction module 500 will now be described in more detail. FIGS. 7A-7E pertain to the noise estimation module 700 according to embodiments of the present invention. FIG. 7A is a schematic block diagram of the noise estimation module 700, which includes a noise estimator unit 710 and a parameter control unit 760. In a preferred embodiment, the noise estimator unit 710 receives the luminance component, $Y_{in}$, of the input pixel data and estimates the noise level of the input video signal 301.

According to a preferred embodiment, the noise estimator unit 710 estimates the noise level of the input video signal 301 by estimating a predetermined percentile of the distribution of a minimum-maximum spread within each of a plurality of segments of pixels with predetermined length. Those segments having pixel values close to black or white levels are excluded to avoid clipping of noise amplitudes. For example, consider FIG. 7B and FIG. 7C, which are two graphs plotting a probability density function, $f_\psi(\psi)$, and a cumulative distribution function, $F_\psi(\psi)$, against the minimum-maximum spread $\psi$, respectively.

Figure 7B:
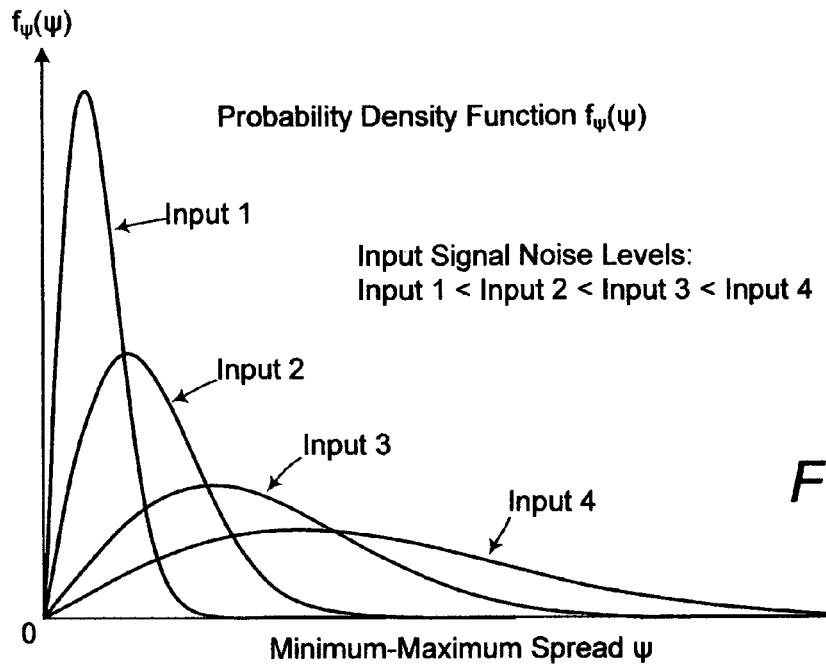
Figure 7C:
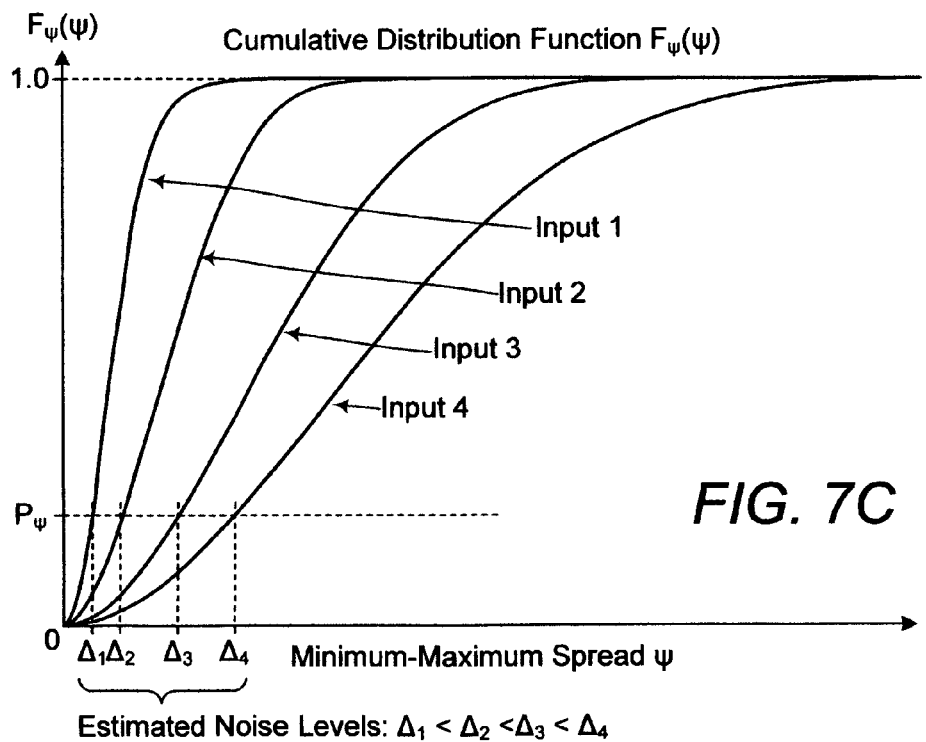
Figure 7D:
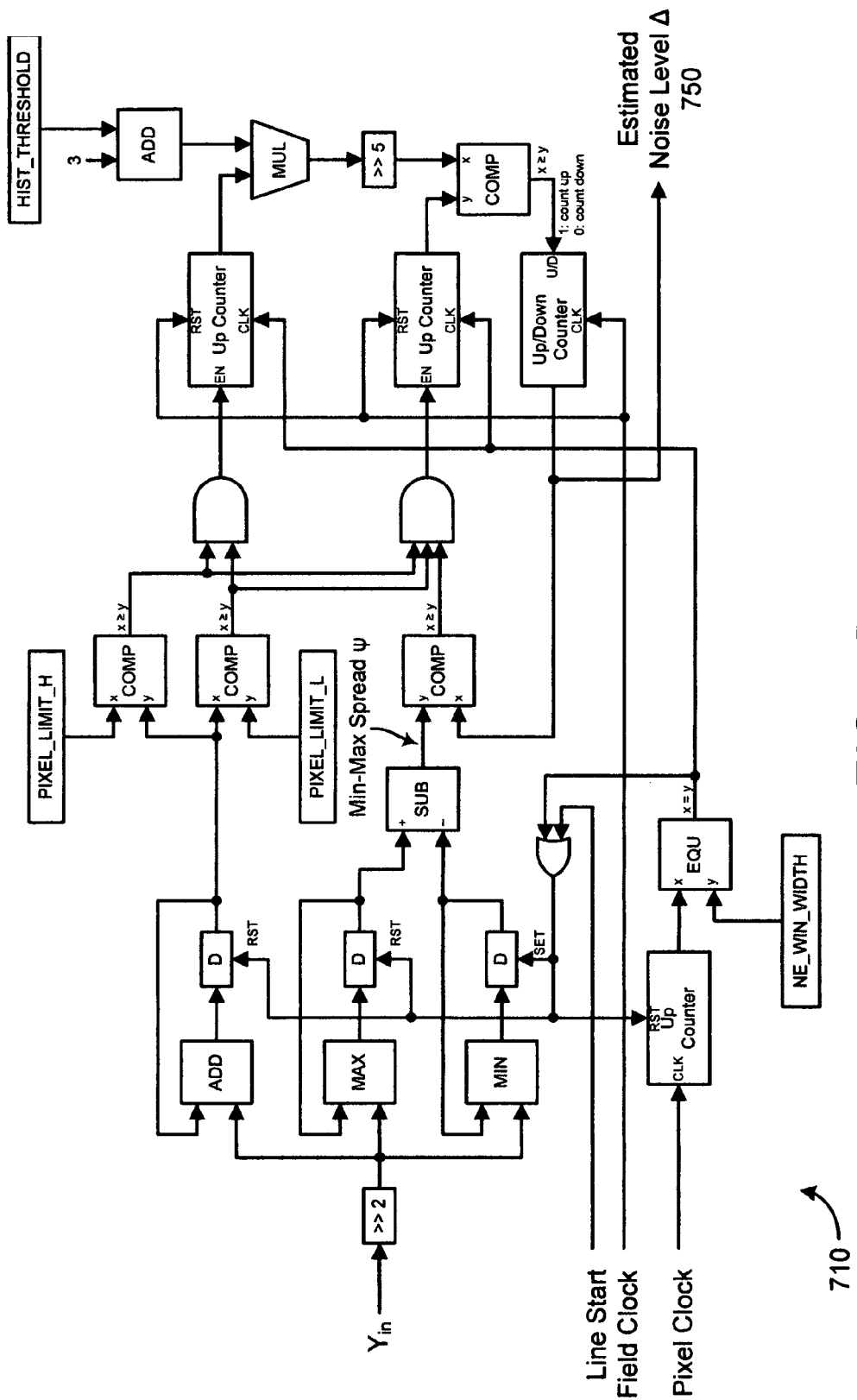

As is shown in FIG. 7B, the probability density function curve $f_\psi(\psi)$ is more pronounced for low noise levels, e.g., "Input 1," than for higher noise levels, e.g., "Input 4." Put another way, the minimum-maximum spread $\psi$ values tend to concentrate on the lower values as the noise levels decrease. Thus, the spread $\psi$ is small for a clean, i.e., low noise level, video signal, while the spread $\psi$ is large for a noisy, i.e., high noise level, video signal. Referring to FIG. 7C, the cumulative distribution function curve, $F_\psi(\psi)$, becomes less steep, i.e., the slope decreases, as noise levels increase. Accordingly, by selecting a predetermined percentile, $P_\psi$, the estimated noise level $\Delta$ (750) of an input video signal (301) can be derived. FIG. 7D is an exemplary logic diagram of the noise estimator unit 710 according to one embodiment of the present invention. The noise estimator unit 710 is configured to generate the estimated noise level $\Delta$ (750) of the input video signal 301 based on the luminance component of the input pixel data, $Y_{in}$.

Figure 7E:
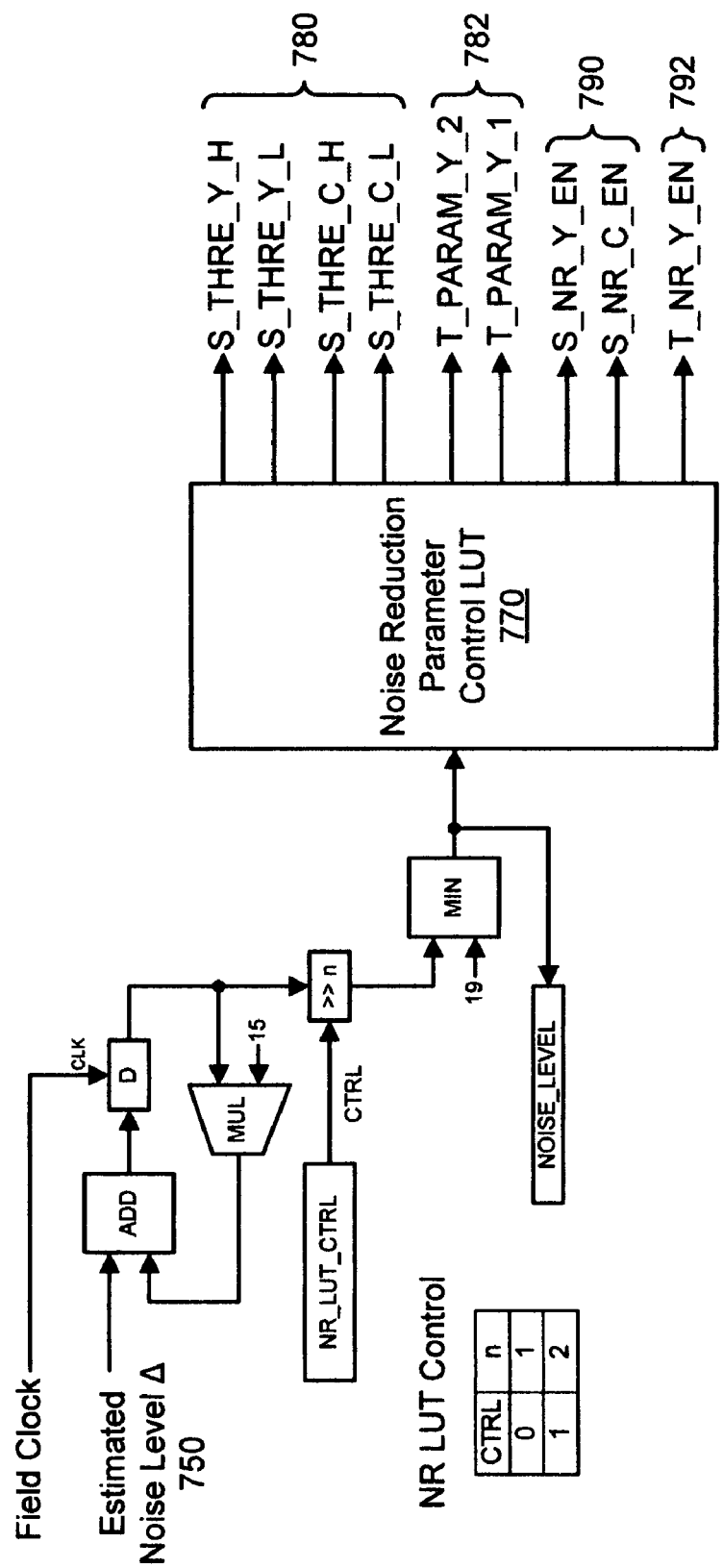

Referring again to FIG. 7A, the estimated noise level $\Delta$ (750) is used by the parameter control unit 760 to identify a plurality of filter parameters. As is shown, the filter parameters comprise high and low threshold values as well as enabling signals, and as stated above, the filter parameters control the noise reduction filters 800, 900. FIG. 7E is an exemplary logic diagram of the parameter control unit 760 according to one embodiment of the present invention. The parameter control unit 760 preferably includes a programmable noise reduction parameter control lookup table (LUT) 770 that receives the estimated noise level $\Delta$ (750) from the noise estimator unit 710 and outputs the first set of filter parameters 780 and the second set of filter parameters 782.

The first set of filter parameters 780 comprise two pairs of high and low threshold values that are correlated to the estimated noise level $\Delta$ (750). The first and second pairs of high and low threshold values apply to luminance and chrominance data values, respectively. The second set of filter parameters 782 comprise one pair of transfer function values that are also correlated to the estimated noise level $\Delta$ (750). The first set of filter parameters 780 control the 3-D spatiotemporal noise reduction filter 800, while the second set of filter parameters 782 control the 1-D temporal noise reduction filter 900.

In one embodiment, the parameter control unit 760 also generates enabling signals 790 for the 3-D spatiotemporal noise reduction filter 800 and an enabling signal 792 for the 1-D temporal noise reduction filter 900. The enabling signals 790, 792 are correlated to the estimated noise level $\Delta$ (750) and their functionality will be described in more detail below. In another embodiment, the enabling signals 790, 792 are predetermined by a system administrator.

Figure 8A:
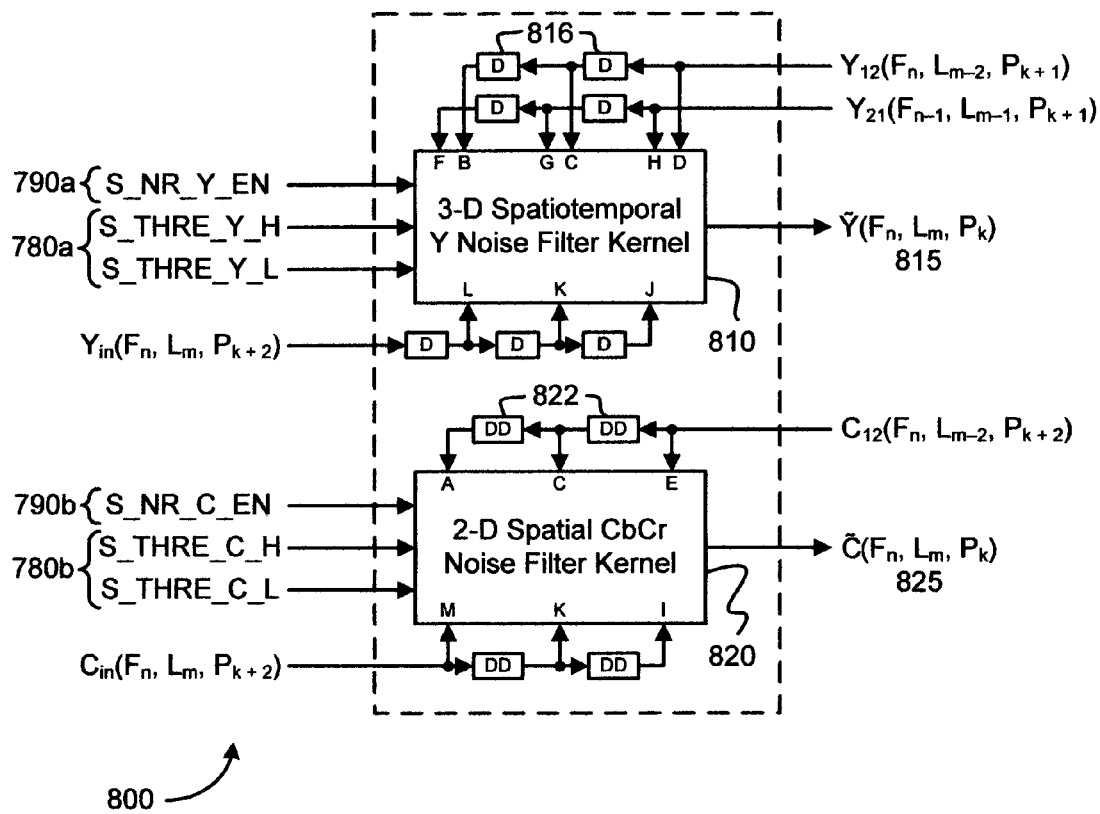
FIGS. 8A-8F pertain to the 3-D spatiotemporal noise reduction filter according to embodiments of the present invention.

As mentioned above, the 3-D spatiotemporal noise reduction filter 800 is controlled by the first set of filter parameters 780 identified by the noise estimation module 700 and filters the noise present in the input pixel data, i.e., the input luminance data ($Y_{in}$) and chrominance data ($Cb_{in}$, $Cr_{in}$). FIGS. 8A-8F pertain to the 3-D spatiotemporal noise reduction filter 800 according to embodiments of the present invention. FIG. 8A is a schematic block diagram of the 3-D spatiotemporal noise reduction filter 800 according to one embodiment. The 3-D spatiotemporal noise reduction filter 800 includes a 3-D spatiotemporal luminance noise filter kernel 810 with a plurality of pixel buffers 816 and a 2-D spatial chrominance noise filter kernel 820 with a plurality of pixel buffers 822. Each noise filter kernel 810, 820 receives pixel data corresponding to selected pixels in at least one video frame (for a progressive input video signal) or video field (for an interlaced input video signal). The selected pixels define a filter support surrounding a target pixel, $P_k$, in a current scan line, $L_m$, in a current frame or field, $F_n$.

Figure 9A:
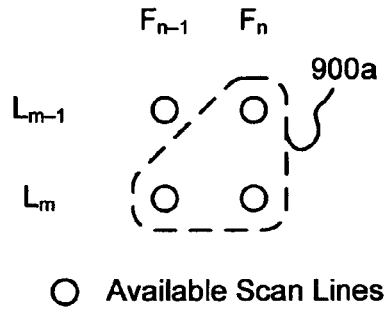
FIGS. 9A-9F illustrate exemplary filter supports for the spatiotemporal noise filter kernels in the 3-D spatiotemporal noise reduction filter according to embodiments of the present invention.
Figure 9B:
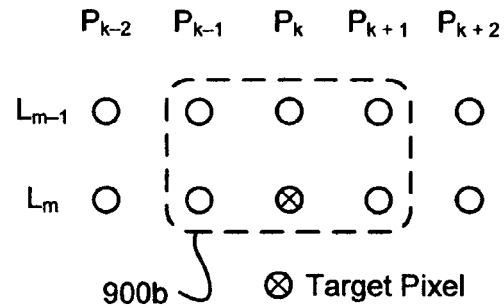

FIG. 9A and FIG. 9B illustrate a filter support for the 3-D spatiotemporal luminance noise filter kernel 810 according to one embodiment. In this embodiment, the video signal is a progressive input signal comprising a plurality of video frames. The filter support includes nine (9) pixels: three (3) pixels in a preceding frame, $F_{n-1}$, and six (6) pixels in the current frame, $F_n$. FIG. 9A illustrates a footprint of the filter support 900a from a vertical-temporal perspective, while FIG. 9B illustrates a footprint of the filter support 900b from a vertical-horizontal perspective. The three (3) pixels in the preceding frame, $F_{n-1}$, are in the current scan line, $L_m$, and in the same pixel positions, $P_k$, $P_{k+1}$, as three (3) pixels in the current frame, $F_n$, two of which are adjacent to the target pixel, $P_k$. The remaining three (3) pixels in the current frame, $F_n$, are located above the target pixel, $P_k$, in a preceding scan line, $L_{m-1}$.

Figure 9C:
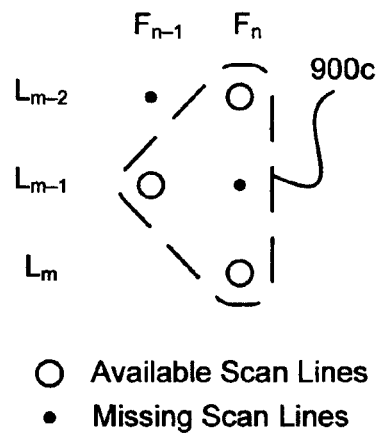
Figure 9D:
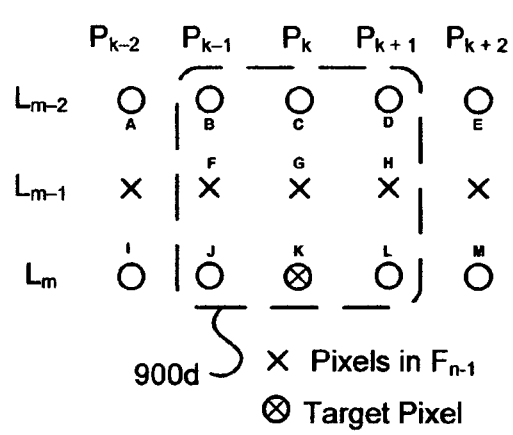

FIG. 9C and FIG. 9D illustrate another filter support for the 3-D spatiotemporal luminance noise filter kernel 810 according to another embodiment. In this embodiment, the video signal is an interlaced input signal comprising a plurality of video fields. The filter support includes nine (9) pixels: three (3) pixels in a preceding field, $F_{n-1}$, and six (6) pixels in the current field, $F_n$. FIG. 9C illustrates a footprint of the filter support 900c from a vertical-temporal perspective, while FIG. 9D illustrates a footprint of the filter support 900d from a vertical-horizontal perspective. The three (3) pixels in the preceding field, $F_{n-1}$, are in the preceding scan line, $L_{m-1}$, and in pixel positions, $P_{k-1}$, $P_k$, $P_{k+1}$. In the current field, $F_n$, the filter support 900d includes three (3) pixels which are in the current scan line, $L_m$, and two of which are adjacent to the target pixel, $P_k$. The remaining three (3) pixels in the current frame, $F_n$, are located above the target pixel, $P_k$, in another preceding scan line, $L_{m-2}$.

The filter supports described above 900a-900d include the pixel luminance data from pixels in the immediately preceding field/frame, $F_{n-1}$, for the 3-D spatiotemporal luminance noise reduction filter kernel 810. In this manner, the memory sizes of field/frame buffers and the memory bandwidth are constrained with only slight performance degradation of the spatiotemporal luminance noise reduction filter kernel 810. Other filter supports can be defined that include pixel data from pixels in other adjacent pixel positions, other preceding or subsequent scan lines, and other preceding or subsequent fields/frames, however, and the present invention need not be limited to the filter supports described above.

Figure 9E:
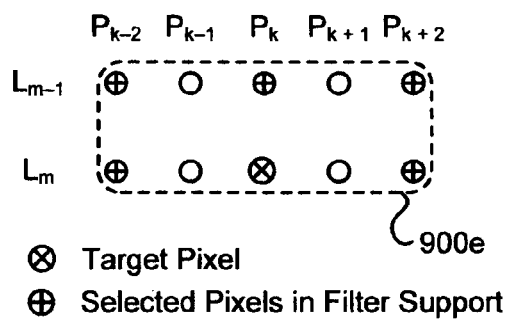
Figure 9F:
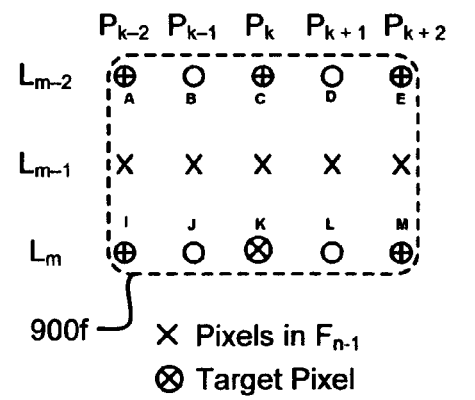

FIGS. 9E and 9F illustrate filter supports for the 2-D spatial chrominance noise filter kernel 820 according to one embodiment. In the embodiment illustrated in FIG. 9E, the video signal is a progressive input signal, and in the embodiment illustrated in FIG. 9F, the video signal is an interlaced input signal. In both embodiments, the filter support 900e, 900f includes six (6) pixels in the current frame, Fn. Three (3) pixels are in the current scan line, $L_m$, and three (3) pixels are located above the target pixel, $P_k$, in a preceding scan line, $L_{m-1}$ for filter support 900e and $L_{m-2}$ for filter support 900f. In a preferred embodiment, two of the pixels in the current scan line, $L_m$, are positioned at $P_{k-2}$ and $P_{k+2}$, around the target pixel, $P_k$. The selection of these pixels is based on an input video signal in the YCbCr 4:2:2 sampling format, which is well known to people skilled in the art. According to the YCbCr 4:2:2 sampling format, the chrominance pixel data (Cb, Cr) are sampled at one half of the sampling rate of the luminance pixel data (Y) along each scan line. Therefore, for every two luminance (Y) data samples there are one pair of chrominance (Cb, Cr) data samples at the same position of one of the two luminance (Y) data samples. Because the nearest chrominance (Cb, Cr) data samples are two pixels apart along a scan line, pixels along each scan line in each filter support (900e, 900f) for the 2-D spatial chrominance noise filter kernel 820 are two pixels apart. Moreover, because there is one pair of chrominance (Cb, Cr) data samples for every two pixels, only one 2-D spatial chrominance noise filter kernel 820 operating at the pixel sampling rate can handle both Cb and Cr data samples in a multiplexed time sharing mode.

Referring again to FIG. 8A, the 3-D spatiotemporal luminance noise filter kernel 810 receives the luminance component, Y, of the pixel data corresponding to the pixels in the corresponding filter support and uses a subset of the first set of filter parameters 780a, which define high and low luminance threshold values, to reduce noise in the luminance component of the target pixel. Similarly, the 2-D spatial chrominance noise filter kernel 820 receives the chrominance component, (Cb, Cr), of the pixel data corresponding to the pixels in the associated filter support and uses a second subset of the first set of filter parameters 780b, which define high and low chrominance threshold values, to reduce noise in the chrominance components of the target pixel.

In one embodiment, the high and low threshold values 780a, 780b determine the extent to which each filter kernel 810, 820 will filter their respective components. For example, if the input video signal is clean, i.e., noise levels are low, the high and low threshold values 780a, 780b will be small and each filter kernel 810, 820 will perform minimal or no noise filtering. If, on the other hand, the input video signal is noisy, the high and low threshold values 780a, 780b, will be large and the filter kernels 810, 820 will filter more aggressively. In this manner, aggressive noise filtering is provided when needed, e.g., when the input video signal is noisy, and little or no noise filtering is performed when the input video signal is clean. Thus, unnecessary noise filtering, which can degrade the image quality of a clean video signal, is avoided.

In another embodiment, each filter kernel 810, 820 is a difference dependent weighted average filter kernel that determines a weighting for each pixel within the filter support based on an absolute difference between the pixel under consideration and the target pixel. In one embodiment, the relationship between the absolute difference and the weighting is a programmable monotonous decreasing function, such as those illustrated in FIGS. 10A and 10B.

Figure 10A:
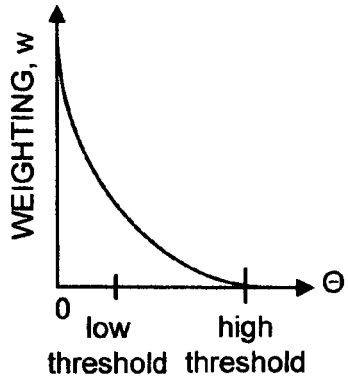
FIGS. 10A-10C illustrate monotonous decreasing functions each describing a relationship between an absolute difference between a neighbor pixel under consideration within a filter support and a target pixel, and a weighting for the neighbor pixel according to two embodiments.
Figure 10B:
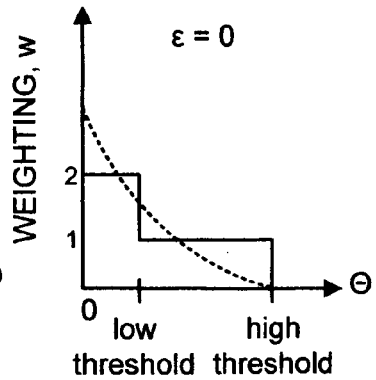

As is shown in both FIGS. 10A and 10B, when the absolute difference, $\Theta$, between a first pixel of the filter support and the target pixel is relatively small, the likelihood that the difference is due to noise is large, and therefore the weighting for the first pixel should be large. On the other hand, if the absolute difference, $\Theta$, between a second pixel of the filter support and the target pixel is relatively large, the likelihood that the difference is due to noise, as opposed to content, is low. More likely, the large difference is due to the presence of an edge in the image data. In this case, the weighting for the second pixel is small, and therefore, the second pixel will not be considered relevant for de-noising purposes. In this manner, the difference dependent weighted average filter kernels 810, 820 can achieve noise reduction while preserving an edge in the image data.

According to one embodiment, each filter kernel 810, 820 aggregates the weighting for each pixel of the filter support and aggregates the weighted pixel value of each pixel of the filter support. Each kernel 810, 820 then calculates an output 815, 825 by dividing the aggregated weighted pixel values by the aggregated weightings. In a preferred embodiment, the output of the 3-D spatiotemporal luminance noise filter kernel 810 is the luminance component of the noise-filtered target pixel 815, while the output of the 2-D spatial chrominance noise filter kernel 820 is the chrominance component of the noise-filtered target pixel 825.

Figure 8B:
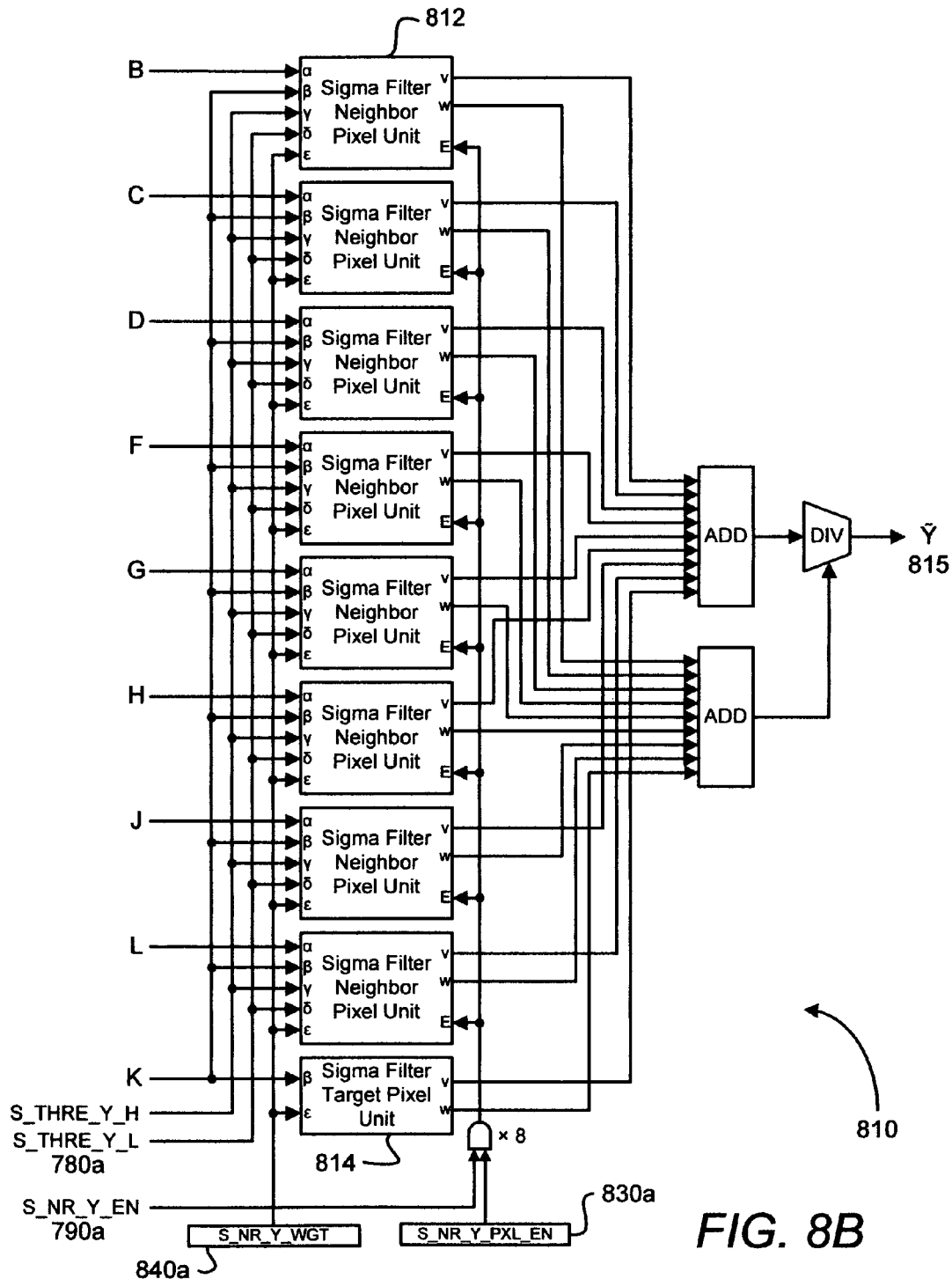
Figure 8C:
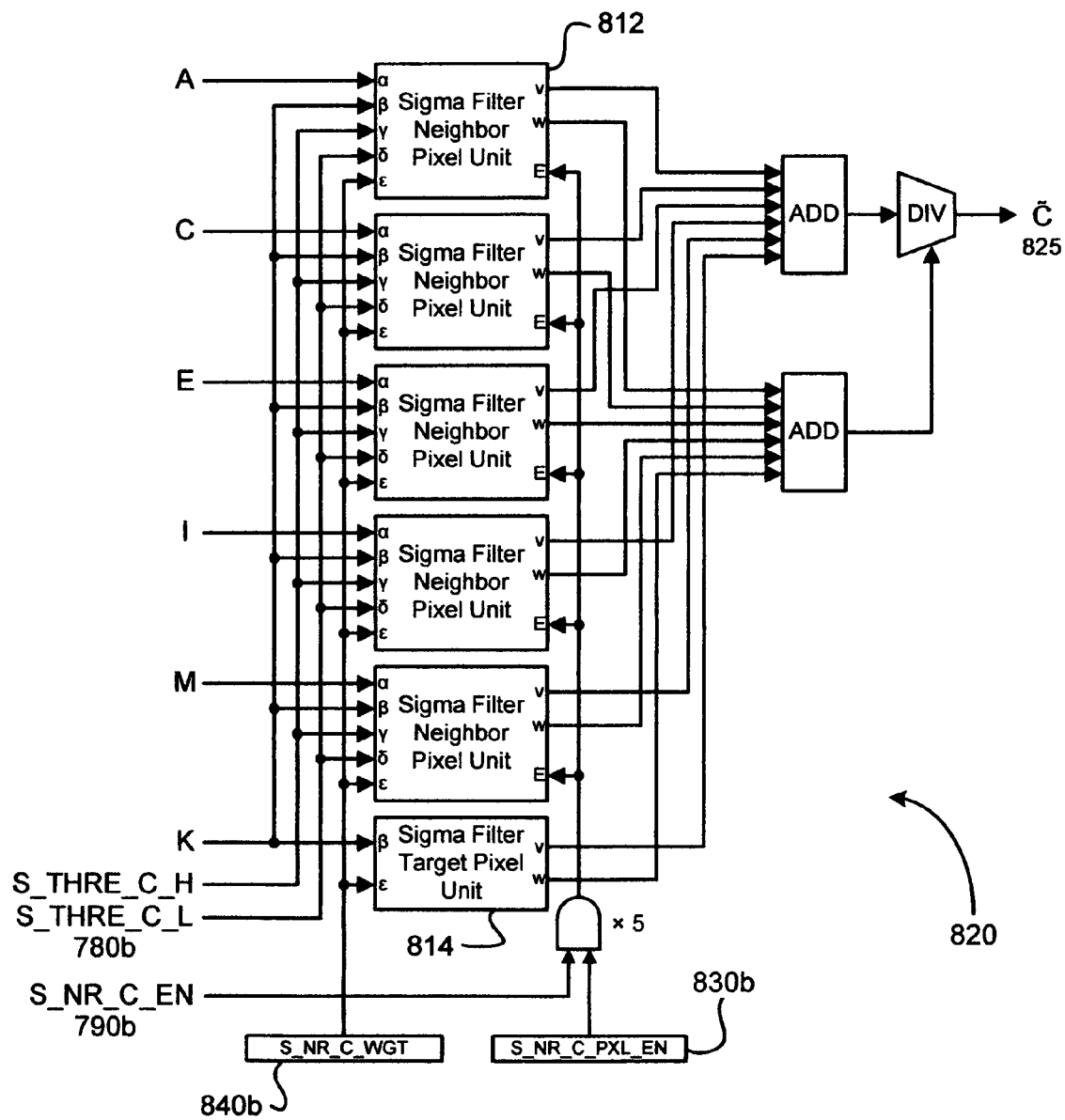

FIGS. 8B-8E illustrate exemplary logic diagrams of the filter kernels 810, 820. Referring to FIG. 8B and FIG. 8C, each filter kernel 810, 820 includes a plurality of sigma filter neighbor pixel units 812 corresponding to each neighbor pixel of the filter support, and a sigma filter target pixel unit 814 associated with the target pixel. In one embodiment, the filter support of each noise filter kernel 810, 820 is controlled by the enabling signals 790a, 790b based on the estimated noise level $\Delta$ (750). In another embodiment, the filter support of each noise filter kernel 810, 820 is programmable by predetermined pixel enable settings 830a, 830b. Together, the enabling signals 790a, 790b and pixel enable settings 830a, 830b activate or deactivate selected sigma filter neighbor pixel units 812 corresponding to selected input pixels, e.g., pixels B-D, F-H, J and L of the 3-D noise filter kernel 810 (see FIG. 9D), and pixels A, C, E, I, and M of the 2-D noise filter kernel 820 (see FIG. 9F), in order to define the filter supports for each noise filter kernel 810, 820. For example, when the estimated noise levels are low, a fewer number of pixels closer to the target pixel can be used to form the filter support, thereby avoiding the degradation of the image quality of a clean video signal.

In one embodiment, each activated sigma filter neighbor pixel unit 812 calculates the weighting, w, for the corresponding pixel of the filter support and the weighted pixel value, v. As stated above, the weighting is a function of the absolute difference, $\Theta$, between the pixel value and the target pixel value. The weighting function is a programmable monotonous decreasing function, such as that shown in FIG. 10A, that is controlled by predetermined weighting factors 840a, 840b. In another embodiment, the weighting factors 840a, 840b are based on the estimated noise level $\Delta$ (750) and control the degree to which the weighting w changes with the absolute difference $\Theta$. Thus, the relationship between the weighting w and the corresponding absolute difference $\Theta$ is adapted to the estimated noise level $\Delta$ (750) for optimal noise reduction performance.

Figures 8D, 8E:
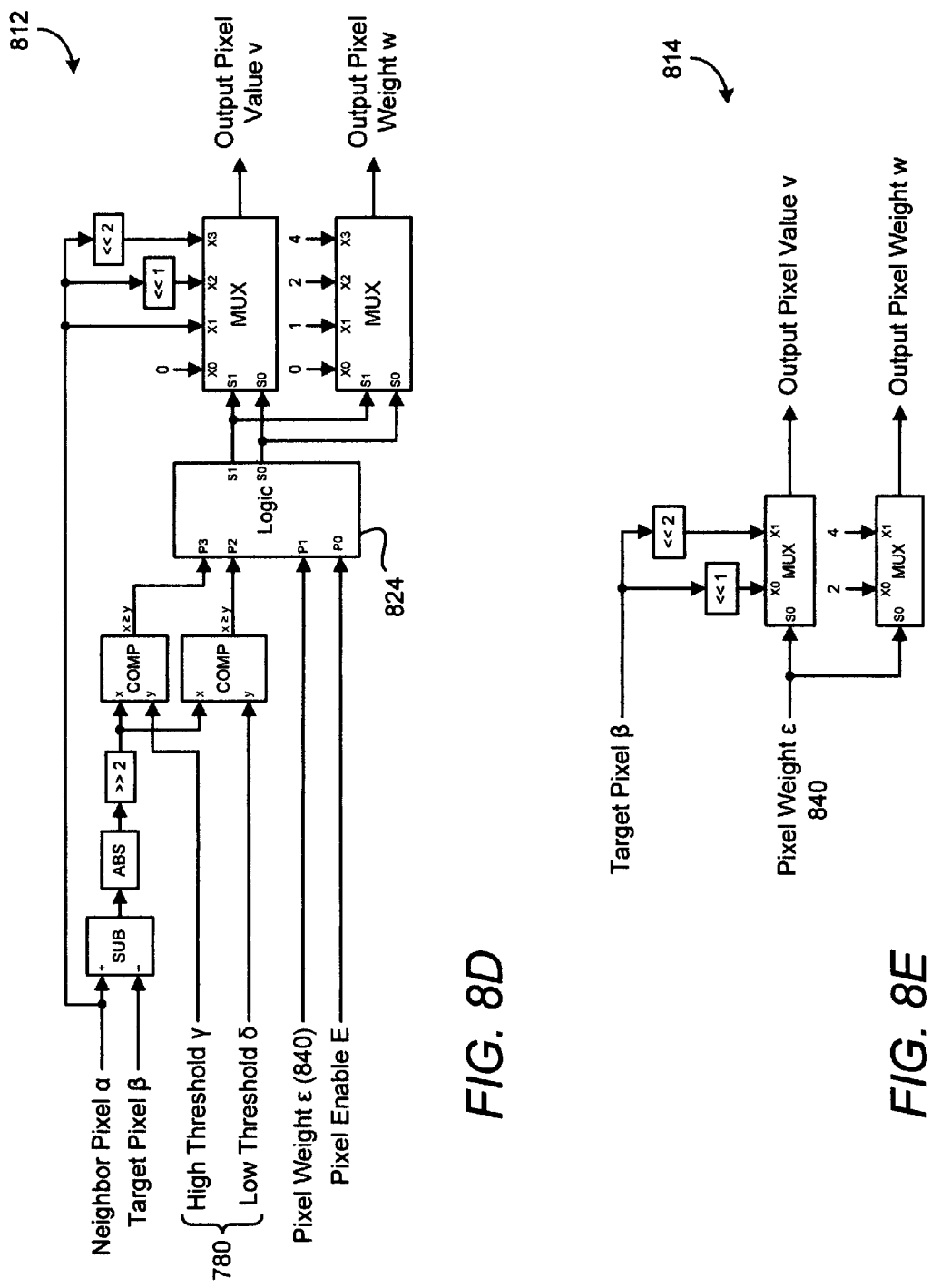
Figure 10C:
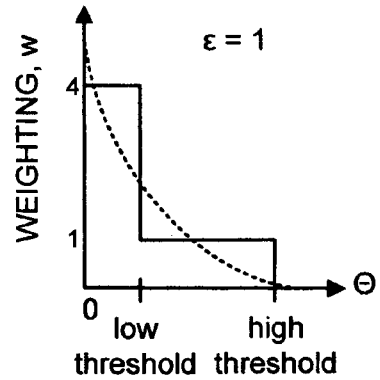

FIG. 8D and FIG. 8E are exemplary logic diagrams of the sigma filter neighbor pixel unit 812 and the sigma filter target pixel unit 814, respectively, according to one embodiment of the present invention. Referring to FIG. 8D, the weighting function is simplified to a monotonous decreasing step function, as shown in FIG. 10B, where the weighting w ranges from zero (0) to two (2) when the weighting factor 840 is a single bit value of zero (0), and from zero (0) to four (4) when the weighting factor 840 has a value of one (1) (FIG. 10C). The absolute difference $\Theta$ is compared to both the high threshold and the low threshold (780), and if the absolute difference $\Theta$ is less than the high threshold and the sigma filter neighbor pixel unit 812 is activated, i.e., E=1, the weighting w is greater than zero, i.e., w={1, 2, 4}. The weighting w and weighted pixel value v are identified using a logic circuit 824 that conforms to the following truth table A:

TABLE A

| P3 | P2 | P1 | P0 | S1 | S0 |
|----|----|----|----|----|----|
| 0 | 0 | 0 | 0 | 0 | 0 |
| 0 | 0 | 0 | 1 | 1 | 0 |
| 0 | 0 | 1 | 0 | 0 | 0 |
| 0 | 0 | 1 | 1 | 1 | 1 |
| 0 | 1 | 0 | 0 | 0 | 0 |
| 0 | 1 | 0 | 1 | 0 | 1 |
| 0 | 1 | 1 | 0 | 0 | 0 |
| 0 | 1 | 1 | 1 | 0 | 1 |
| 1 | 0 | 0 | 0 | d | d |
| 1 | 0 | 0 | 1 | d | d |
| 1 | 0 | 1 | 0 | d | d |
| 1 | 0 | 1 | 1 | d | d |
| 1 | 1 | 0 | 0 | 0 | 0 |
| 1 | 1 | 0 | 1 | 0 | 0 |
| 1 | 1 | 1 | 0 | 0 | 0 |
| 1 | 1 | 1 | 1 | 0 | 0 |

Figure 8F:
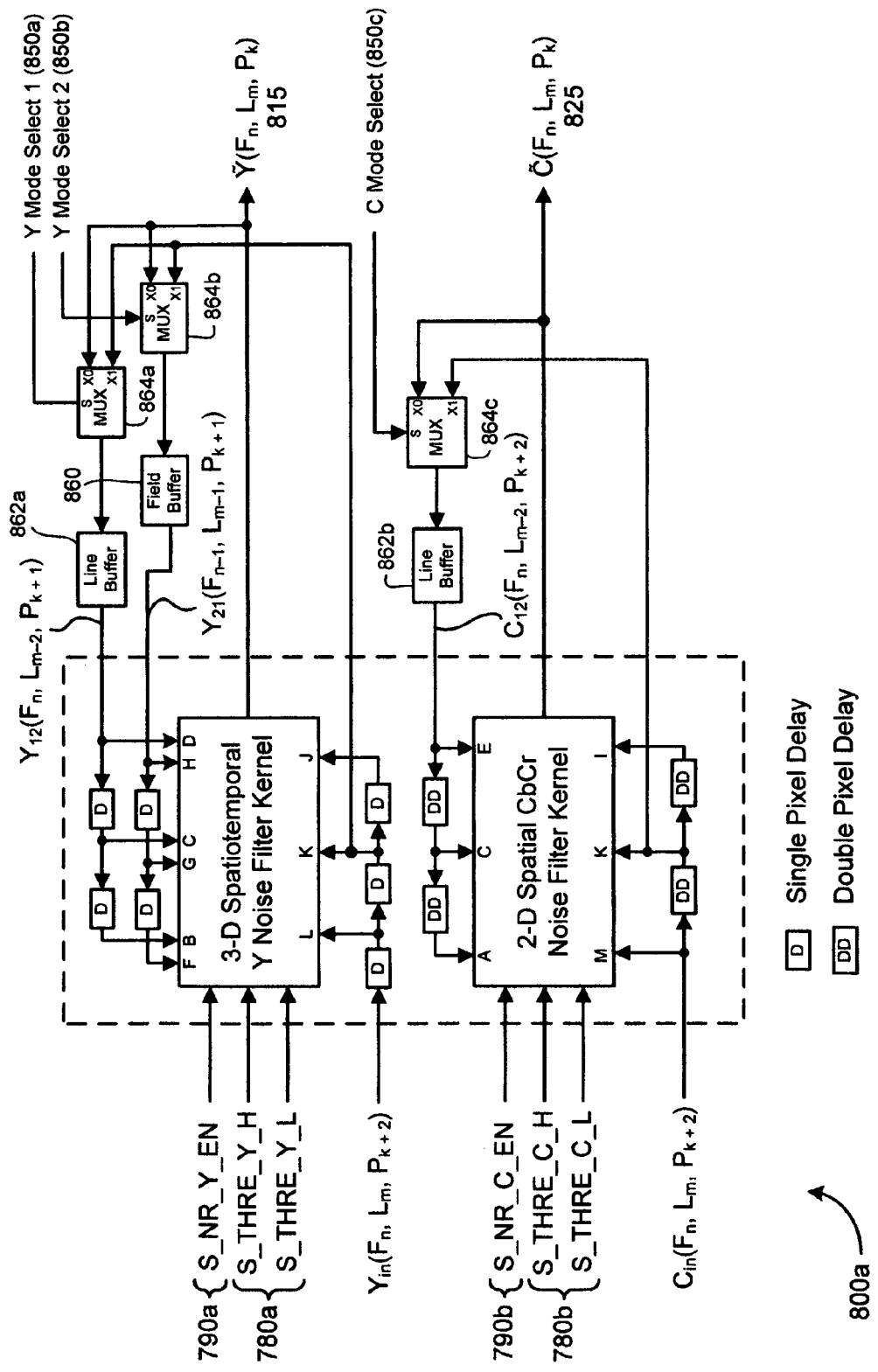

According to another embodiment, illustrated in FIG. 8F, the 3-D spatiotemporal noise reduction filter 800a together with field buffer 860, line buffers 862a, 862b, and multiplexers 864a-864c can be reconfigurable to operate in either a transversal mode (i.e., FIR mode), a recursive mode (i.e., IIR mode), or a hybrid mode. In the transversal mode, a delayed input video signal is provided to the filter kernels 810, 820, while in the recursive mode, a delayed filtered video signal is provided to the filter kernels 810, 820. Two (2) Y Mode Select signals 850a, 850b and one (1) C Mode Select signal 850c determine the inputs into the 3-D noise filter kernel 810 and the 2-D noise filter kernel 820, respectively. Each select signal 850a-850c can be based on the estimated noise level $\Delta$ (750) of the input video signal. For instance, if the input video signal is clean, the noise filter kernels 810, 820 can be configured to operate in the transversal mode for less image blurring. If the input video signal is noisy, the noise filter kernels 810, 820 can be configured to operate in the recursive mode for more noise filtering. In one embodiment, each set of inputs of the filter kernels 810, 820 can be configured individually according to the input video signal type and noise level, i.e., the mode select signals 850a-850c need not be equal.

As mentioned above, the 3-D spatiotemporal noise reduction filter 800, 800a filters the noise present in the input video signal 301, and outputs a noise-filtered luminance component 815 and a noise-filtered chrominance component 825. According to one embodiment, the noise-filtered luminance component 815 is further filtered by the 1-D temporal noise reduction filter with motion compensation 900, which is controlled by the second set of filter parameters 782 identified by the noise estimation module 700. The second set of filter parameters 782 comprise one pair of transfer function values that are also correlated to the estimated noise level $\Delta$ (750). The second set of filter parameters 782 determine the extent to which the noise-filtered luminance component 815 is filtered if motion is detected between frames or fields. Like the first set of filter parameters 780, the second set of filter parameters 782 controls the 1-D temporal noise reduction filter 900 so that if the noise level of the input video signal is low, i.e., the video signal is clean, noise filtering is less aggressive. Thus, noise filtering is aggressive only when it is necessary, and degradation of a clean input video signal is prevented.

Figure 11A:
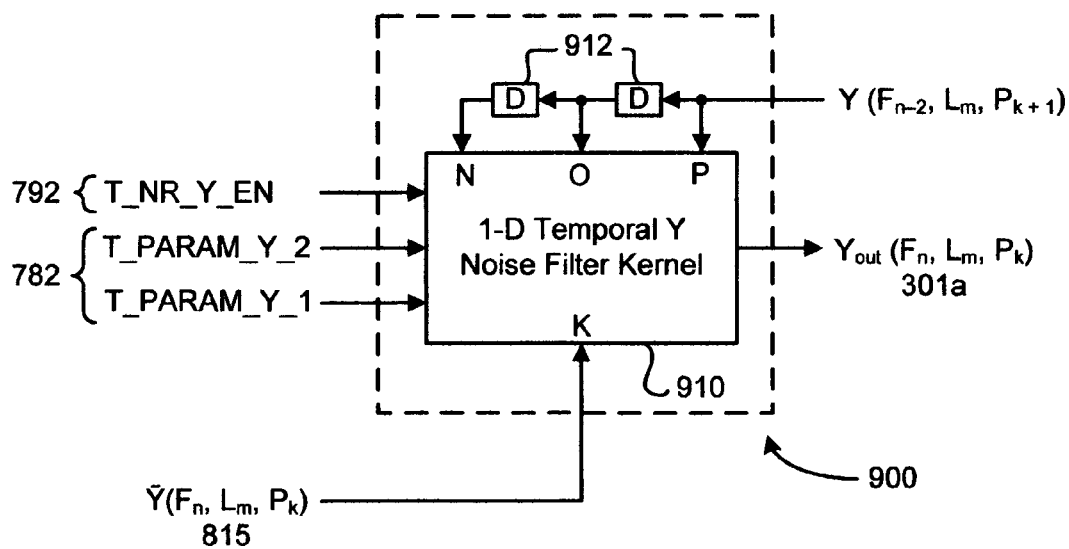
FIGS. 11A-11E pertain to the 1-D temporal noise reduction filter with motion compensation according to embodiments of the present invention.

FIGS. 11A-11E pertain to the 1-D temporal noise reduction filter with motion compensation 900 according to embodiments of the present invention. FIG. 11A is a schematic block diagram of the 1-D temporal luminance noise reduction filter 900 according to one embodiment, which includes a 1-D temporal noise filter kernel 910 and a plurality of pixel buffers 912. The 1-D temporal luminance noise filter kernel 910 receives pixel data corresponding to selected pixels in at least two video frames (for a progressive input video signal) or fields (for an interlaced input video signal). The selected pixels define a motion detection window relating to the target pixel, $P_k$, in the current scan line, $L_m$, in the current frame or field, $F_n$.

FIG. 12A illustrates an exemplary motion detection window 1200a for the 1-D temporal luminance noise filter kernel 910 according to one embodiment. In this embodiment, the video signal is an interlaced video signal comprising a plurality of video fields. The window 1200a includes three (3) pixels in a second preceding field, $F_{n-2}$, which is of the same parity as the current field, $F_n$. The three (3) pixels are in the current scan line, $L_m$, and in the pixel positions, $P_{k-1}, P_k, P_{k+1}$. In another embodiment, illustrated in FIGS. 12B and 12C, where the video signal is also an interlaced video signal, the motion detection window 1200b includes pixels in a first preceding field, $F_{n-1}$, and in the second preceding field, $F_{n-2}$, so that motion can be measured between opposite-parity and same-parity fields.

Referring again to FIG. 11A, the 1-D temporal luminance noise filter kernel 910 receives the luminance component, of the pixel data corresponding to the pixels within the corresponding motion detection window 1200a, e.g., the window shown in FIG. 12A, and uses the second set of filter parameters 782 to filter noise in the noise-filtered luminance component ($\tilde{Y}$) of the target pixel, $P_k$ (815). According to an embodiment of the present invention, the 1-D temporal noise reduction filter 900 is a recursive noise reduction filter that can operate in frame recursive mode for progressive input video signals and in frame or field recursive mode for interlaced input video signals.

Figure 11B:
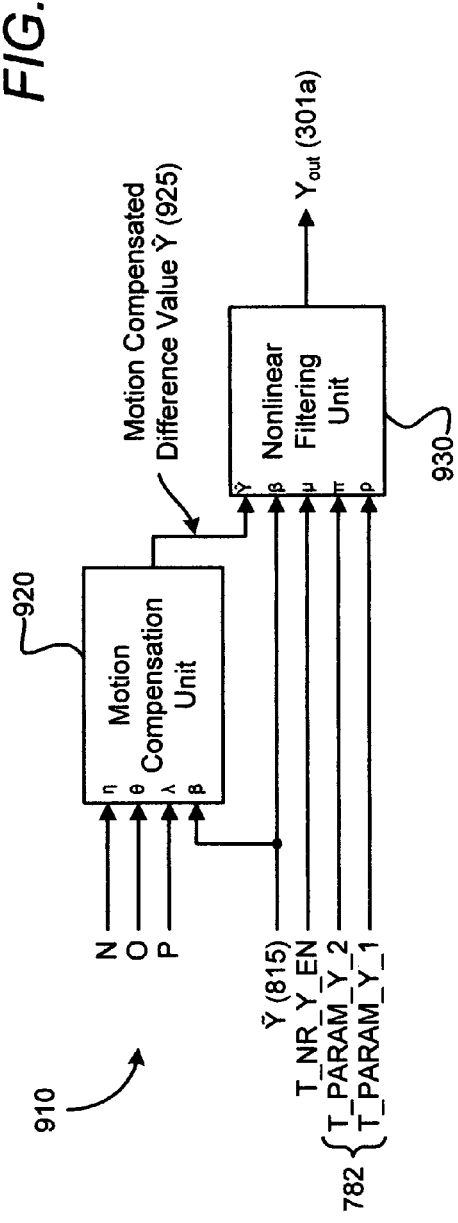

FIG. 11B is a schematic block diagram of the 1-D temporal luminance noise filter kernel 910 according to one embodiment. The 1-D temporal luminance noise filter kernel 910 includes a motion compensation unit 920 and a nonlinear filtering unit 930. The motion compensation unit 920 receives the luminance pixel data corresponding to the pixels within the motion detection window 1200a and calculates the difference between each pixel within the window 1200a, e.g., pixels N, O, and P, and the target pixel, K, and then derives a motion compensated difference value $\hat{Y}$ (925). The motion compensated difference value $\hat{Y}$ (925) represents the estimated difference between the target pixel, K, and the hypothetical pixel in the second preceding field, $F_{n-2}$, within the window 1200a nearest to an estimated motion trajectory that passes through the target pixel, K.

Figure 11C:
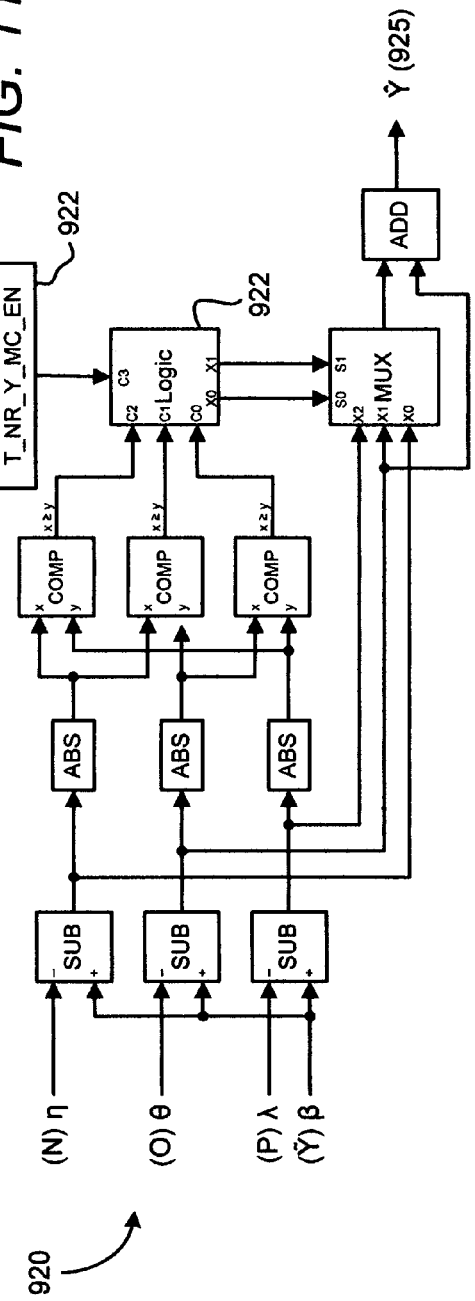

FIG. 11C is an exemplary logic diagram of the motion compensation unit 920 according to an embodiment of the present invention. In a preferred embodiment, if motion detection is enabled by, e.g., assigning a predetermined motion enable setting 921 to a single bit value of one (1), the motion compensated difference value $\hat{Y}$ (925) is the sum of the difference of the pixel within the window 1200a at the same corresponding pixel position of the target pixel and the target pixel, e.g., pixel O minus pixel K, and the smallest difference between any of the pixels within the window 1200a and the target pixel, i.e., the smallest of pixel N minus pixel K, pixel O minus pixel K, or pixel P minus pixel K. If motion detection is disabled, e.g., by assigning the predetermined motion enable setting 921 to a single bit value of zero (0), the motion compensated difference value $\hat{Y}$ (925) is twice the difference of the pixel within the window 1200a at the same corresponding pixel position of the target pixel and the target pixel, e.g., pixel O minus pixel K. The smallest difference is identified using a logic circuit 922 that conforms to the following truth table B:

TABLE B

| C3 | C2 | C1 | C0 | X1 | X0 |
|----|----|----|----|----|----|
| 0  | 0  | 0  | 0  | 0  | 1  |
| 0  | 0  | 0  | 1  | 0  | 1  |
| 0  | 0  | 1  | 0  | 0  | 1  |
| 0  | 0  | 1  | 1  | 0  | 1  |
| 0  | 1  | 0  | 0  | 0  | 1  |
| 0  | 1  | 0  | 1  | 0  | 1  |
| 0  | 1  | 1  | 0  | 0  | 1  |
| 0  | 1  | 1  | 1  | 0  | 1  |
| 1  | 0  | 0  | 0  | 0  | 0  |
| 1  | 0  | 0  | 1  | 0  | 0  |
| 1  | 0  | 1  | 0  | 0  | 1  |
| 1  | 0  | 1  | 1  | d  | d  |
| 1  | 1  | 0  | 0  | d  | d  |
| 1  | 1  | 0  | 1  | 1  | 0  |
| 1  | 1  | 1  | 0  | 0  | 1  |
| 1  | 1  | 1  | 1  | 1  | 0  |

Figure 11D:
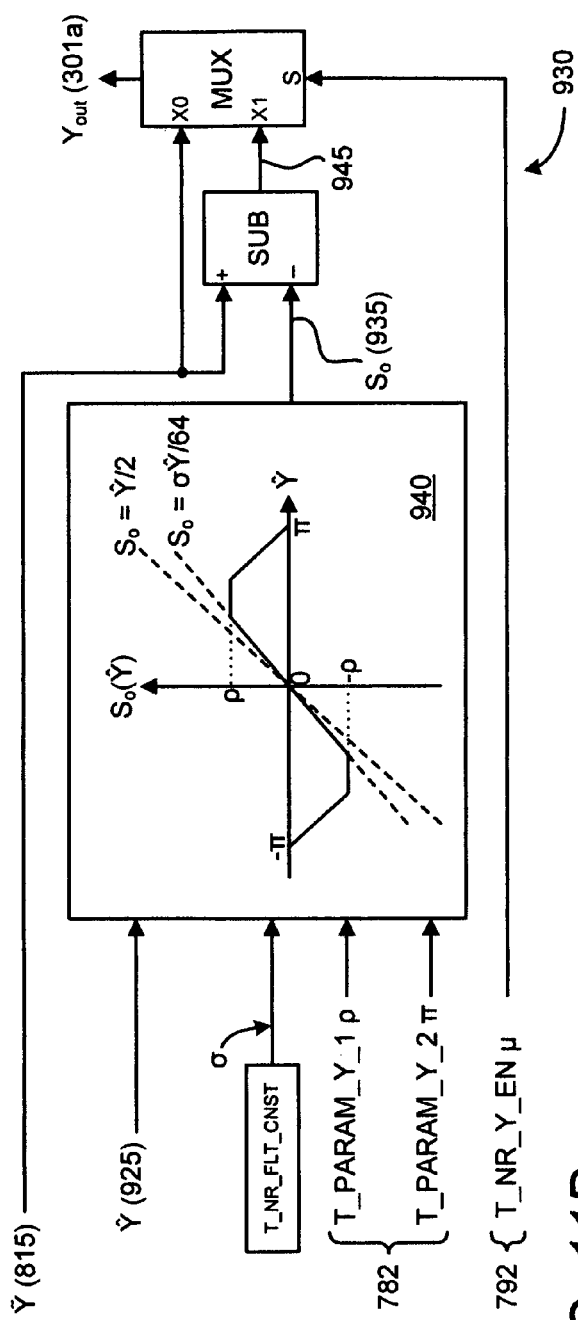

FIG. 11D is an exemplary block diagram of the nonlinear filtering unit 930 according to an embodiment of the present invention. The nonlinear filtering unit 930 receives the motion compensated difference value $\hat{Y}$ (925) along with the second set of filter parameters 782 that comprise a pair of transfer function values, $\pi$ and $\rho$, the temporal noise reduction filter enabling signal 792, and the noise-filtered luminance component ($\tilde{Y}$) of the target pixel (815).

Figure 11E:
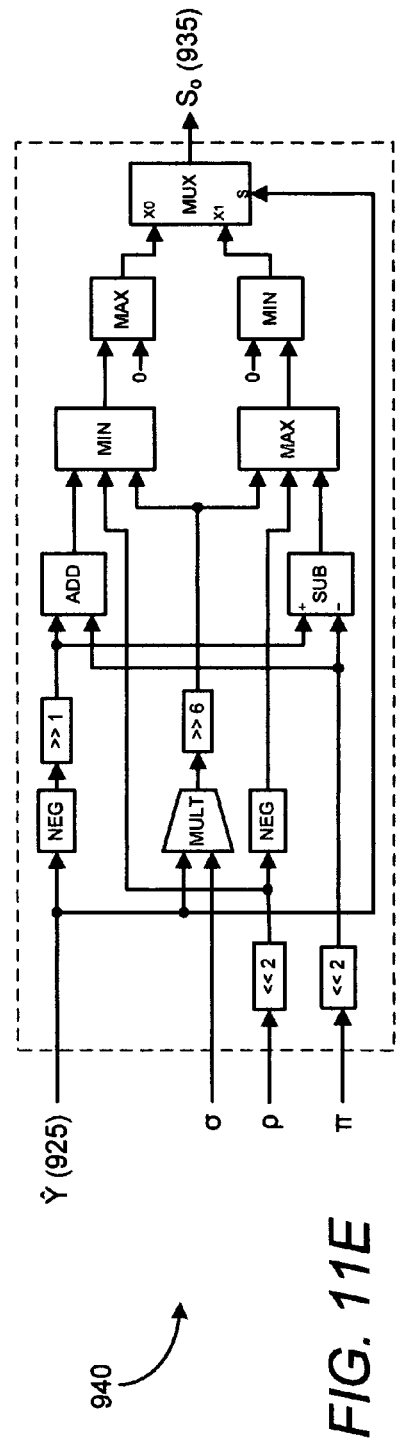

The nonlinear filtering unit 930 generates a noise estimate $S_o$ (935) based on the motion compensated difference value $\hat{Y}$ (925). In one embodiment, the relationship between the noise estimate $S_o$ (935) and the motion compensated difference value $\hat{Y}$ (925) is the function shown in block 940, which is defined by the transfer function values, $\pi$ and $\rho$, and a predetermined slope value, $\sigma$. If the absolute value of the motion compensated difference value $\hat{Y}$ (925) is greater than or equal to the value of $\pi$, the noise estimate $S_o$ (935) is zero. Otherwise, the noise estimate $S_o$ (935) has a value between negative $\rho$ and positive $\rho$, except when the motion compensated difference value $\hat{Y}$ is equal to zero, as shown in FIG. 11D. In this manner, the 1-D temporal noise reduction filter 900 can change the direction of the filtering along the motion trajectory of a moving object within the motion detection window 1200a without disturbing the noise estimating process. FIG. 11E illustrates a logic diagram that performs the function shown in block 940.

Based on the value of the enabling signal 792, the final noise-filtered luminance output $Y_{out}$ (301a) is either the noise-filtered luminance component ($\tilde{Y}$) of the target pixel (815) or a motion compensated filtered luminance component of the target pixel 945, generated by subtracting the noise estimate $S_o$ (935) from the noise-filtered luminance component ($\tilde{Y}$) of the target pixel (815).

Embodiments of the present invention provide a noise reduction module that digitally reduces the noise present in an input video signal. The noise reduction module requires less hardware/software complexity than that of the prior art and produces high output image quality with substantially reduced white Gaussian noise and low-frequency noise. In one embodiment, the noise reduction module is utilized by a display system, such as a television. In this embodiment, the noise reduction module is integrated with a motion detection system in a motion-adaptive de-interlacer and frame rate converter such that existing memory structures, e.g., field/frame buffers, are shared, thus reducing complexity, cost, and power consumption of the display system.

Features of the noise reduction module include a reliable noise level estimator that controls filtering parameters for the 3-D spatiotemporal and 1-D temporal noise reduction filters for proper filtering under different noise levels of the input video signal; a reconfigurable transversal/recursive 3-D spatiotemporal noise reduction filter that provides a delayed input video signal or a delayed filtered video signal to the spatiotemporal noise reduction filter kernel; difference dependent weighted average filter kernels with a programmable difference-weighting relationship and a programmable filter support used for 3-D spatiotemporal noise reduction filtering; and a recursive 1-D temporal noise reduction filter with motion compensation for different motion detection windows.

The present invention has been described with reference to certain preferred versions. Nevertheless, other versions are possible. For example, the number of pixels and the shapes of the filter supports can vary. Further, alternative steps equivalent to those described for the noise filtering process can also be used in accordance with the principles of the described implementations, as would be apparent to one of ordinary skill. Therefore, the spirit and scope of the appended claims should not be limited to the description of the preferred versions contained herein.

What is claimed is:

1. A method of reducing noise levels in an input video signal comprising pixel data, the method comprising:
   receiving input pixel data of the input video signal, wherein the input pixel data comprises luminance data and chrominance data;
   estimating a noise level of the input video signal using the luminance data of the input pixel data;
   identifying a plurality of filter parameters based on the estimated noise level;
   filtering the input pixel data using a three dimensional spatiotemporal noise reduction filter that is controlled by a first set of the plurality of filter parameters;
   filtering the filtered input pixel data using a one dimensional temporal noise reduction filter with motion compensation that is controlled by a second set of the plurality of filter parameters; and
   generating a noise-filtered video signal comprising the filtered input pixel data from the three dimensional spatiotemporal noise reduction filter and the motion compensated filtered input pixel data from the one dimensional temporal noise reduction filter.

2. The method of claim 1 wherein filtering the pixel data comprises calculating a difference dependent weighted average based on a target pixel in a first video field/frame and a plurality of neighboring pixels in the first video field/frame and a plurality of neighboring pixels in other video fields/frames.

3. The method of claim 2 wherein the three dimensional spatiotemporal noise reduction filter comprises a three dimensional filter kernel and a two dimensional filter kernel, and wherein filtering the pixel data further comprises:
   using the three dimensional filter kernel to calculate the difference dependent weighted average of the luminance data of the target pixel based on the plurality of neighboring pixels in the first video field/frame and the plurality of neighboring pixels in the other video fields/frames; and
   using the two dimensional filter kernel to calculate the difference dependent weighted average of the chrominance data of the target pixel based on the plurality of neighboring pixels in the first video field/frame.

4. The method of claim 1 wherein the three dimensional spatiotemporal noise reduction filter is reconfigurable to operate in a transversal mode or in a recursive mode depending on the estimated noise level, and wherein filtering the input pixel data comprises:
   operating the three dimensional spatiotemporal noise reduction filter in the recursive mode if the estimated noise level is greater than a predetermined threshold level; and
   inputting a delayed filtered video signal into the three dimensional spatiotemporal noise reduction filter.

5. The method of claim 4 wherein filtering the input pixel data further comprises:
   operating the three dimensional spatiotemporal noise reduction filter in the transversal mode if the estimated noise level is less than or equal to the predetermined threshold level; and
   inputting a delayed input video signal into the three dimensional spatiotemporal noise reduction filter.

6. The method of claim 1 wherein filtering the filtered input pixel data comprises:
   defining a motion detection window comprising a target pixel in a first video field/frame and a plurality of pixels in other video fields/frames;
   calculating a motion compensated difference value based on differences between a target pixel and the other pixels in the motion detection window; and
   using a nonlinear noise filtering process to filter noise based on the motion compensated difference value.

7. The method of claim 1 wherein filtering the filtered input pixel data comprises:
   receiving the filtered luminance data of the input pixel data from the three dimensional spatiotemporal noise reduction filter;
   calculating a motion compensated difference value based on differences between the luminance component of a target pixel in a first video field/frame and the luminance components of a plurality of pixels in other video fields/frames; and
   using a nonlinear noise filtering process to filter noise based on the motion compensated difference value.

8. A method of detecting motion in an input video signal comprising pixel data from a plurality of interlaced video fields, the method comprising:
   receiving input pixel data of the input video signal, wherein the input pixel data comprises luminance data and chrominance data;
   reducing noise levels in the input video signal by:
      estimating a noise level of the input video signal using the luminance data of the input pixel data;
      identifying a plurality of filter parameters based on the estimated noise level;
      filtering the input pixel data using a three dimensional spatiotemporal noise reduction filter that is controlled by a first set of the plurality of filter parameters;
      filtering the filtered input pixel data using a one dimensional temporal noise reduction filter with motion compensation that is controlled by a second set of the plurality of filter parameters; and
      generating a noise-filtered video signal comprising the filtered input pixel data from the three dimensional spatiotemporal noise reduction filter and the motion compensated filtered input pixel data from the one dimensional temporal noise reduction filter;
   receiving the noise-filtered pixel data corresponding to pixels from a first interlaced video field having a specified parity, and from two adjacent interlaced video fields having a parity opposite to the specified parity;
   comparing the noise-filtered pixel data from the first and two adjacent interlaced video fields; and
   calculating per-pixel motion measures between the first interlaced video field and each of the two adjacent interlaced video fields and between the two adjacent interlaced video fields.

9. A system for reducing noise levels in an input video signal comprising pixel data, the system comprising:
   a noise estimation unit for receiving input pixel data of the input video signal, wherein the input pixel data comprises luminance data and chrominance data, and for estimating a noise level of the input video signal;
   a parameter control unit coupled to the noise estimation unit for identifying a plurality of filter parameters based on the estimated noise level;
   a three dimensional spatiotemporal noise reduction filter for filtering the input pixel data, wherein the three dimensional spatiotemporal noise reduction filter is controlled by a first set of the plurality of filter parameters; and
   a one dimensional temporal noise reduction filter with motion compensation for filtering the filtered input pixel data, wherein the one dimensional temporal filter reduction filter is controlled by a second set of the plurality of noise parameters.

10. The system of claim 9 wherein the three dimensional spatiotemporal noise reduction filter comprises a three dimensional spatiotemporal filter kernel and a two dimensional spatial filter kernel, wherein the three dimensional spatiotemporal filter kernel is configured to calculate a difference dependent weighted average of the luminance data of a target pixel in a first video field/frame based on a plurality of neighboring pixels in the first video field/frame and a plurality of neighboring pixels in the other video fields/frames, and wherein the two dimensional spatial filter kernel is configured to calculate a difference dependent weighted average of the chrominance data of the target pixel based on the plurality of neighboring pixels in the first video field/frame.

11. The system of claim 9 wherein the three dimensional spatiotemporal noise reduction filter is reconfigurable to operate in a transversal mode or in a recursive mode depending on the estimated noise level.

12. The system of claim 11 wherein the three dimensional spatiotemporal noise reduction filter is configured to operate in the recursive mode if the estimated noise level is greater than a predetermined threshold level, wherein a delayed filtered video signal is inputted to the three dimensional spatiotemporal noise reduction filter.

13. The system of claim 12 wherein the three dimensional spatiotemporal noise reduction filter is configured to operate in the transversal mode if the estimated noise level is less than or equal to the predetermined threshold level, wherein a delayed input video signal is inputted to the three dimensional spatiotemporal noise reduction filter.

14. The system of claim 9 further comprising means for defining a motion detection window comprising a target pixel in a first video field/frame and a plurality of pixels in other video fields/frames, and wherein the one dimensional temporal noise reduction filter includes a motion compensation unit configured to calculate a motion compensated difference value based on differences between a target pixel and the pixels in the motion detection window, and a nonlinear noise filtering unit configured to filter noise based on the motion compensated difference value.

15. The system of claim 9 wherein the one dimensional temporal noise reduction filter includes a motion compensation unit configured to calculate a motion compensated difference value based on differences between the luminance data of a target pixel in a first video field/frame and the luminance data of a plurality of pixels in other video fields/frames, and a nonlinear noise filtering unit configured to filter noise based on the motion compensated difference value.

16. A system for detecting motion in an input video signal comprising pixel data from a plurality of interlaced video fields, the system comprising:

an external memory for storing the pixel data from the plurality of interlaced video fields;

a memory controller module coupled to the external memory for managing the pixel data;

a plurality of pixel data read modules coupled to the memory controller module, wherein each pixel data read module receives pixel data from an associated video field;

a per-pixel motion measurement module coupled to the plurality of pixel data read modules, wherein the motion measurement module is configured to measure motion between interlaced video fields of same and opposite parity; and a noise reduction module coupled to the plurality of pixel data read modules, wherein the noise reduction module is configured to receive the input pixel data of the input video signal, to filter noise in the input video signal, and to transmit a noise-filtered video signal to the per-pixel motion measurement unit for further processing;

wherein the noise reduction module and the per-pixel motion measurement module are configured to share the plurality of data read modules, the memory controller module, and the external memory, thereby reducing costs, complexity and power consumption of the system.

* * * * *